(12) United States Patent
Felton et al.

(10) Patent No.: US 11,408,182 B2
(45) Date of Patent: Aug. 9, 2022

(54) NATURAL FIBER COMPOSITE CONSTRUCTION MATERIALS

(71) Applicant: Panelshake Corp., Campbell, CA (US)

(72) Inventors: Colin Felton, Coos Bay, OR (US); Deepak Shrestha, Madison, WI (US)

( * ) Notice: Subject to any disclaimer, the term of this patent is extended or adjusted under 35 U.S.C. 154(b) by 80 days.

(21) Appl. No.: 16/832,722

(22) Filed: Mar. 27, 2020

(65) Prior Publication Data

US 2020/0224433 A1 Jul. 16, 2020

Related U.S. Application Data

(63) Continuation of application No. PCT/US2018/053575, filed on Sep. 28, 2018.

(60) Provisional application No. 62/565,953, filed on Sep. 29, 2017, provisional application No. 62/565,945, filed on Sep. 29, 2017, provisional application No. 62/565,947, filed on Sep. 29, 2017.

(51) Int. Cl.

| | |
|---|---|
| *E04F 15/10* | (2006.01) |
| *C08K 3/01* | (2018.01) |
| *C08K 3/22* | (2006.01) |
| *C08K 3/26* | (2006.01) |
| *C08L 75/08* | (2006.01) |
| *E01B 3/44* | (2006.01) |
| *E04F 13/16* | (2006.01) |

(52) U.S. Cl.
CPC ........... *E04F 15/102* (2013.01); *C08K 3/01* (2018.01); *C08K 3/22* (2013.01); *C08K 3/26* (2013.01); *C08L 75/08* (2013.01); *E01B 3/44* (2013.01); *E04F 13/16* (2013.01); *C08K 2003/2217* (2013.01); *C08L 2201/02* (2013.01)

(58) Field of Classification Search
None
See application file for complete search history.

(56) References Cited

U.S. PATENT DOCUMENTS

| | | | |
|---|---|---|---|
| 5,234,981 A | | 8/1993 | Arfiche et al. |
| 5,869,173 A | * | 2/1999 | Zheng ............. C08K 7/28 428/313.3 |
| 5,969,173 A | | 10/1999 | Clarke et al. |
| 8,911,656 B2 | | 12/2014 | Doddman et al. |
| 2001/0051243 A1 | | 12/2001 | Godavarti et al. |
| 2004/0137210 A1 | | 7/2004 | Ochoa et al. |
| 2007/0078191 A1 | | 4/2007 | Guhde et al. |

(Continued)

FOREIGN PATENT DOCUMENTS

| | | |
|---|---|---|
| EP | 1185584 B1 | 4/2005 |
| JP | 2009/074029 A | 4/2009 |

(Continued)

OTHER PUBLICATIONS

International Search Report and Written Opinion for International Application No. PCT/US18/53575 dated Nov. 23, 2018.

(Continued)

*Primary Examiner* — Chinessa T. Golden

(57) ABSTRACT

Natural fiber composite construction materials including boards, siding, railroad ties, standing seam roofing panels, roofing panels that support solar-electric modules, and roofing panels that support vegetation are provided. In various embodiments, composite construction materials comprise about 50-60% kenaf fiber.

20 Claims, 22 Drawing Sheets

(56) References Cited

U.S. PATENT DOCUMENTS

| | | |
|---|---|---|
| 2007/0167540 A1 | 7/2007 | Vijayendran et al. |
| 2010/0021753 A1* | 1/2010 | Hojabr .................... B32B 5/30 |
| | | 428/507 |
| 2010/0037548 A1* | 2/2010 | Kalkanoglu .......... B29C 48/307 |
| | | 52/309.1 |
| 2011/0258956 A1 | 10/2011 | Felton |
| 2015/0128335 A1 | 5/2015 | Dehni |
| 2020/0224433 A1 | 7/2020 | Felton et al. |

FOREIGN PATENT DOCUMENTS

| | | | | |
|---|---|---|---|---|
| JP | 4377540 B2 | 12/2009 | | |
| WO | WO-91/07473 A1 | 5/1991 | | |
| WO | WO-2013/048754 A1 | 4/2013 | | |
| WO | WO-2013048754 A1 * | 4/2013 | ............. | H01B 7/295 |
| WO | WO-2015/188017 A1 | 12/2015 | | |
| WO | WO-2015188017 A1 * | 12/2015 | ........... | B29C 64/118 |

OTHER PUBLICATIONS

International Preliminary Report on Patentability for International Application No. PCT/US2018/053575 dated Apr. 9, 2020.
Extended European Search Report for EP Application No. EP 18863765 dated Sep. 20, 2021.

* cited by examiner

NATURAL FIBER COMPOSITE CONSTRUCTION MATERIALS

CROSS-REFERENCE TO RELATED APPLICATIONS

This application is a continuation of International Application No. PCT/US2018/053575, filed Sep. 28, 2018, which claims the benefit of U.S. Provisional Application Nos. 62/565,945, 62/565,947, and 62/565,953, each filed Sep. 29, 2017, each of which is hereby incorporated by reference herein in its respective entirety.

BACKGROUND

Embodiments of the present disclosure relate to fiber-reinforced polymer members, and more specifically, to natural fiber composite construction materials including decking boards, siding, railroad ties, standing seam roofing panels, roofing panels that support solar-electric modules, roofing panels that support vegetation.

BRIEF SUMMARY

According to embodiments of the present disclosure, natural fiber reinforced devices are provided. In various embodiments, the devices include a fiber-reinforced polymer composite, a longitudinal axis, a first end and a second end along the longitudinal axis, a void space within the body. In various embodiments, the composite includes a polymer matrix, a natural fiber reinforcement, and a long fiber reinforcement. In various embodiments, the natural fiber reinforcement includes kenaf fibers and the kenaf fibers have an aspect ratio of about 5:1 to about 100:1 dispersed within the polymer matrix and the long fiber reinforcement comprising long fibers extending from the first end to the second end. In various embodiments, the long fibers may include natural fibers and/or synthetic fibers.

According to embodiments of the present disclosure, composite decking boards are provided. In various embodiments, a composite board comprises a structural shell having at least one void therein and low-density polyethylene foam disposed throughout the at least one void. The structural shell comprises high-density polyethylene and about 60% kenaf fiber, about 2% inorganic pigment, about 0.1% synergistic hindered amine light stabilizer, about 0.05% phenolic antioxidant, about 0.05% phosphite heat stabilizer, about 3% magnesium hydroxide fire retardant, about 1% zinc borate fungicide, and about 2% maleic anhydride grafted polyethylene coupling agent.

According to embodiments of the present disclosure, composite siding boards are provided. In various embodiments, a composite siding board comprises a structural shell having at least one void formed by a concave portion thereof and low-density polypropylene foam disposed within the at least one void. The structural shell comprises polypropylene and about 60% kenaf fiber, about 3% inorganic pigment, about 0.1% HALS UV stabilizer, about 0.1% antioxidant, about 5% magnesium hydroxide fire retardant, about 1% zinc borate fungicide, and about 2% maleic anhydride grafted polypropylene coupling agent.

According to embodiments of the present disclosure, composite railroad ties are provided. In various embodiments, a railroad tie comprises a structural shell having two substantially parallel voids extending parallel to a central axis of the structural shell and a plurality of blocks disposed within the two substantially parallel voids at regular intervals. The structural shell comprises polyethylene and about 60% kenaf fiber, about 1% carbon black, about 0.1% HALS UV light stabilizer, about 0.1% antioxidant or heat stabilizer, about 1% zinc borate fungicide, and about 2% Maleic anhydride grafted polyethylene coupling agent. The plurality of blocks comprise about 50% rice hulls, about 48% recycled post-consumer HDPE, and about 2% maleic anhydride grafted HDPE.

According to embodiments of the present disclosure, composite roofing panels are provided. In various embodiments, a roofing panel comprises of a sheet thermoformed to have interlocking seams on each edge. The roofing panel comprises polyethylene and about 50% kenaf fiber, about 4% inorganic pigment, about 0.1% HALS UV stabilizer, about 0.1% antioxidant, about 5% magnesium hydroxide fire retardant, about 3% zinc borate fungicide, and about 2% maleic anhydride grafted polyethylene coupling agent.

According to embodiments of the present disclosure, composite roofing panels are provided. In various embodiments, a roofing panel comprises of structural grid that allows the direct mounting of solar electric modules. The material comprises polyethylene and about 50% kenaf fiber, about 1% carbon black, about 0.1% HALS UV stabilizer, about 0.1% antioxidant, about 5% magnesium hydroxide fire retardant, about 2% zinc borate fungicide, and about 2% maleic anhydride grafted polyethylene coupling agent.

According to embodiments of the present disclosure, a decking board is provided. In various embodiments, the decking board includes a body comprising a fiber-reinforced polymer composite a longitudinal axis, a first end and a second end along the longitudinal axis, and a void space within the body. In various embodiments, the composite includes a polymer matrix, a short fiber reinforcement, and a long fiber reinforcement. In various embodiments, the short fiber reinforcement includes fibers having an aspect ratio of about 5:1 to about 100:1 dispersed within the polymer matrix and the long fiber reinforcement includes long fibers extending from the first end to the second end.

According to embodiments of the present disclosure, a siding board is provided. In various embodiments, the siding board includes a body comprising a fiber-reinforced polymer composite, a longitudinal axis, a first end and a second end along the longitudinal axis, and a void space within the body. In various embodiments, the composite includes a polymer matrix, a short fiber reinforcement, and a long fiber reinforcement. In various embodiments, the short fiber reinforcement includes fibers having an aspect ratio of about 5:1 to about 100:1 dispersed within the polymer matrix and the long fiber reinforcement includes long fibers extending from the first end to the second end.

According to embodiments of the present disclosure, a railroad tie is provided. In various embodiments, the railroad tie includes a body comprising a fiber-reinforced polymer composite, a longitudinal axis, a first end and a second end along the longitudinal axis, and a void space within the body. In various embodiments, the composite includes a polymer matrix, a short fiber reinforcement, and a long fiber reinforcement. In various embodiments, the short fiber reinforcement includes fibers having an aspect ratio of about 5:1 to about 100:1 dispersed within the polymer matrix and the long fiber reinforcement includes long fibers extending from the first end to the second end.

According to embodiments of the present disclosure, a roofing panel is provided. In various embodiments, the roofing panel includes a body comprising a fiber-reinforced polymer composite, a longitudinal axis, and a first end and a second end along the longitudinal axis. In various embodiments, the composite includes a polymer matrix, a short fiber reinforcement, and a long fiber reinforcement. In various embodiments, the short fiber reinforcement includes fibers having an aspect ratio of about 5:1 to about 100:1 dispersed within the polymer matrix and the long fiber reinforcement includes long fibers extending from the first end to the second end.

DETAILED DESCRIPTION

Figure 1:
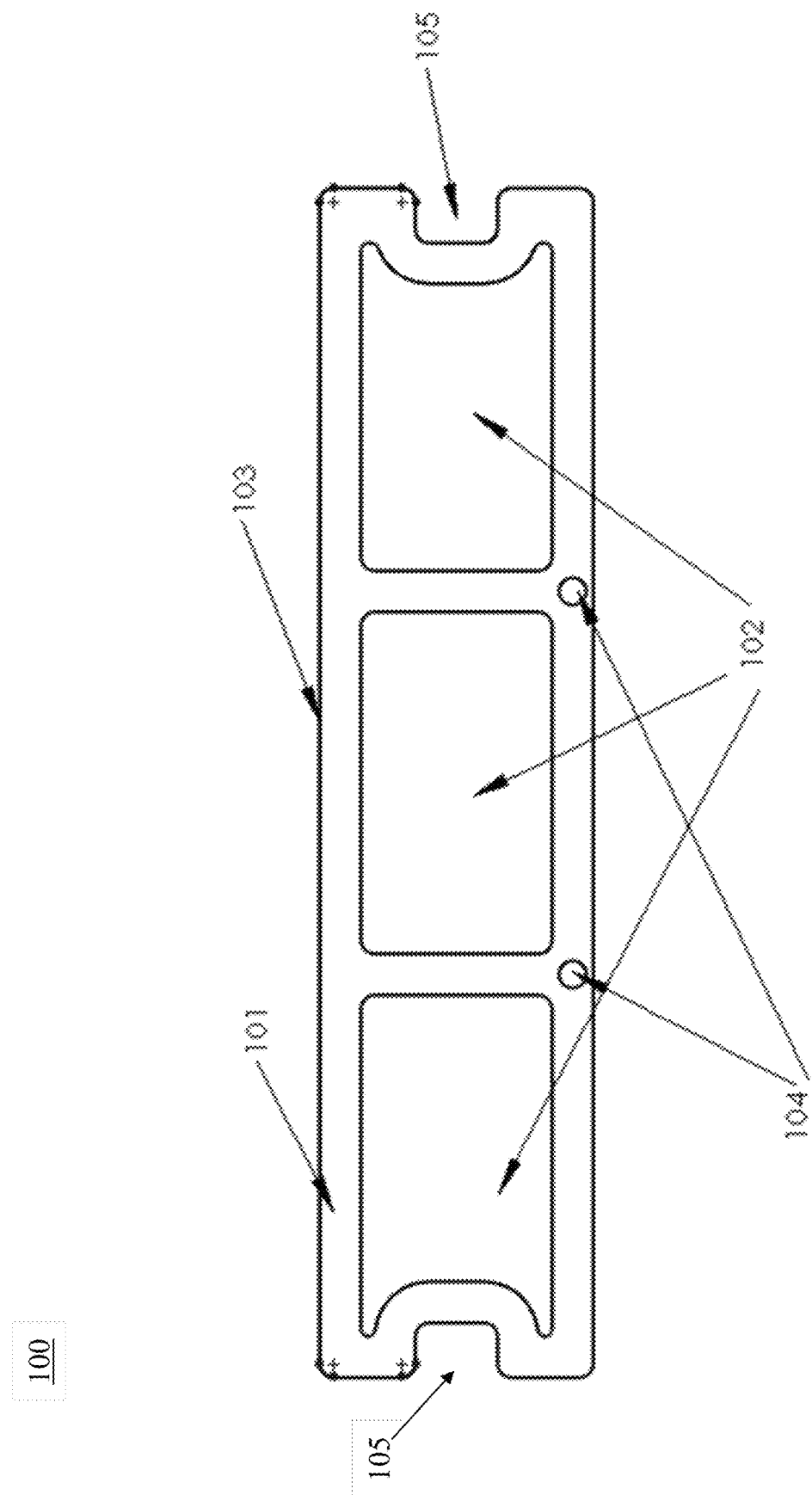
FIG. 1 is a cross-sectional view of a hollow deck board with long fiber reinforcement according to embodiments of the present disclosure.

Low-cost materials such as wood plastic composites used in decking and other exterior applications cannot be used in structural applications with sustained and/or heavy loads due to their low strength, low stiffness, and tendency to creep when under the influence of mechanical stresses over long periods of time. Higher performance composite materials that can be used in structural applications are more expensive and require hollow profiles to be competitive in price. Moreover, these hollow profiles present problems in fastening, joining, and terminating cut ends.

The present disclosure generally describes organic fiber reinforced polymer moldings and/or extrusions that contain up to 70% natural fiber by weight, and, in which additional long fibers (e.g., synthetic fibers) may be introduced into the product at specific predetermined locations to thereby further reinforce the part. In various embodiments, the natural fibers may be uniformly distributed within a polymer matrix. With the addition of the long fiber reinforcement at specific locations, anisotropic material properties are provided that may greatly in improve the strength of the molded or extruded part at lower cost than the alternative of simply increasing the fiber content of the entire part. The ability to specify the position and/or orientation of reinforcements in a composite also enables new designs for parts that may be used in the construction industry. The organic fiber and thermoplastic composites described herein may include any suitable thermoplastic polymers compounded with one or more natural fibers. In various embodiments, natural lignocellulosic fibers (such as sisal, jute, hemp, nanocellulose, kenaf, bamboo, etc.) are some of the types of natural fibers that may be used. In various embodiments, other organic fibers may be used that are not lignocellulose based. For manufacturing purposes, it is generally preferable that the organic fiber does not melt or degrade during processing of the polymer matrix.

In various embodiments, the compositions described herein include composites of natural fibers within a thermoplastic matrix in which the natural fibers have aspect ratios (length to diameter) of five or more to 1. In various embodiments, the fiber aspect ratios exceed 20 to 1. In various embodiments, the fibers have an aspect ratio of at least 100 to 1. In the composite bodies that are extruded, the fibers may be aligned along the longitudinal axis.

In various embodiments, the composite parts (e.g., boards and/or molded objects) described herein may include a fiber reinforcement having long fibers extending from one end of the part to another end of the part (e.g., along the longitudinal length of the part). This long fiber reinforcement may be included in addition to the fibers that are disposed (uniformly) within the polymer matrix, such as the natural fibers described above having aspect ratios of, e.g., 5:1, 20:1, and/or 100:1. In various embodiments, the long fibers may include synthetic fibers, such as, for example, long glass fiber strands or fabric. In various embodiments, the long fibers may be molded into the part at predetermined locations. In various embodiments, the long fibers may comprise between 0% and 25% of the composite part by weight. Preferably, the long fibers comprise between 5% and 20% of the composite part by weight.

The term "about" or "approximately", as used herein with respect to numerical values generally means a composition margin of error of +/−10% with respect to long fiber reinforcement; +10%/−20% with respect to short fiber reinforcement, +/−1% with respect to carbon black pigment, +/−2.5% with respect to inorganic pigment, +10%/−5% with respect to fire retardant, +/−2% with respect to fungicide, +/−2% with respect to coupling agent, +/−0.5% with respect to light stabilizer, and +/−0.5% with respect to antioxidant. For any other numerical values not covered in the above list, the margin of error may be +/−5% of the stated value.

Natural Fiber-Reinforced Polymer Boards

To address these and other disadvantages of alternative approaches, the present disclosure provides for low-cost, lightweight boards suitable for various applications including, e.g., decking, joists, railings, and posts. In various embodiments, boards are made of a composite of thermoplastics and natural fibers having sufficiently high modulus of elasticity and strength to provide an alternative to solid wood plastic composites in building product application such as decking, joists, railing or posts. In various embodiments, the reinforcing fibers within the boards described herein have an aspect ratio (i.e., the ratio of fiber length to fiber diameter) greater than about 5:1. These boards are also suitable for long-term loads that cause creep in normal wood plastic composites by utilizing predetermined amounts of long fibers in select locations of the board exposed to prolonged tensile stresses. The combination of short natural fibers (rather than particles) compounded into thermoplastics and small amounts of embedded long-fibers enable the structural capabilities described herein while maintaining a low cost.

In various embodiments, the structural part of the board is made from an extruded or molded composite of natural fibers and thermoplastics. In various embodiments, synthetic fibers may be substituted or used in combination with the natural fibers. According to various embodiments, natural fibers may include jute, wood, flax, kenaf, cotton, hemp, nanocellulose, bamboo, cellulose, ramie, banana, pineapple, or sisal. According to various embodiments, thermoplastics include polyolefins (e.g., polyethylene, polypropylene), polyesters (e.g., PET), nylon, PVC, PLA, or. Various embodiments have fibers with an aspect ratio of greater than about 5:1. Some such embodiments have fibers with an aspect ratio of greater than about 20:1. Some such embodiments have fibers with an aspect ratio of greater than about 100:1.

The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10^{-5}/°$ F. In some embodiments, the CLTE is less than about $1 \times 10^{-5}/°$ F. As described below, further addition of long fiber reinforcement increases the MOE and MOR and decreases the CLTE.

A board according to various embodiments is hollow with horizontal or vertical ribs as necessary for structural requirements. In various embodiments, the natural fiber composite formulation includes additives such as pigments, UV light stabilizers, antioxidants, heat stabilizers, fungicides, coupling agents, lubricants, processability improvers, or fire retardants. In various embodiments, the natural fiber composite may include one or more coatings. It will be appreciated that in applications where the exposed part of a board is coated or not exposed to light or fire, the UV stabilizers, pigments, or fire retardants may be excluded.

In various embodiments, pigments include iron oxides and other mixed metal oxides (MMO's), zinc ferrite, carbon black, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate, microban, or microban-type compounds. In various embodiments, coupling agents include maleated polyolefins or Maleic anhydride grafted styrene-ethylene-butylene-styrene block copolymer (SEBS-g-MA). In various embodiments, fire retardants include magnesium hydroxide, alumina trihydrate, or borates. Other suitable additives and/or coatings useful in composite manufacturing will be apparent to one skilled in the art upon consideration of this disclosure.

In various embodiments, the hollow portions of the boards may be filled by co-extrusion or post extrusion injection with a low-density foam. These foams can be made from polymers such as polyolefins that have chemical blowing agents or are saturated with gas or thermoset polymers, such as polyurethane. In various embodiments, polyolefins include polypropylene, polyethylene, or low density polyethylene. These foams can be pigmented, for example, with iron oxides and other mixed metal oxides (MMO's), zinc ferrite, carbon black, or titanium dioxide to match the top and side surfaces of the board. Similar to the parts described above, the foams may likewise include UV stabilizers, antioxidants, or fire retardants. In various embodiments, low-density foams may include syntactic foams made from a blend of materials, e.g., polyolefins blended with glass microspheres or thermoset resin(s) and catalysts blended with glass microspheres. In various embodiments, pigments, UV stabilizers, antioxidants, and/or fire-retardants may also be blended into the syntactic foam mixture.

In various embodiments, any exposed surfaces (e.g., top and/or side surfaces) may include a coextruded shell (e.g., capstock) comprised of thermoplastics pigmented to mimic colors of various types of wood. In various embodiments, thermoplastics include ASA, acrylic, fluoropolymer, polyolefin, or PVC. In various embodiments, suitable pigments include iron oxides and other mixed metal oxides (MMO's), zinc ferrite, carbon black, or titanium dioxide. The exposed surface can be embossed with a wood-grain or other texture or have a molded-in or co-extruded veil with a wood-grain or other appearance. The exposed surface can also be painted or primed after surface pretreatment with flame or plasma pre-treatment.

In various embodiments, the structural part of the board is reinforced as necessary to prevent expansion or contraction due to changes in temperature or moisture content. In various embodiments, stiffness is improved with long natural or synthetic fiber bundles, or woven or non-woven fabrics. In various embodiments, natural fibers and fabrics include jute, flax, kenaf, cotton, hemp, nanocellulose, bamboo, cellulose, ramie, banana, pineapple, and/or sisal. In various embodiments, synthetic fibers and/or fabrics may include Kevlar, polyester, nylon, glass, basalt, and/or carbon.

In various embodiments, predetermined amounts of long fibers are included in strategic locations to complement the structural capabilities of the short-fiber reinforced composite. The long fibers may be in the composite in an amount of between about 5% and about 25%. These fibers can be introduced into the extrusion with a cross-head die or laid into the mold for compression or injection molded products.

To provide additional stiffness and strength, the long fiber fabric or strands can be impregnated or coated with a thermoset resin system such as polyurethane, epoxy, or polyester before the fibers are pulled into the die or placed in the mold. In various embodiments, an appropriate catalyst is also introduced. Contact with the high temperature thermoplastic composite activates and cures the thermoset resin. Various thermoset resin systems are available, and a suitable resin may be selected for each application such that it is activated at the temperature of the molten thermoplastic composite, and reacts at a sufficient rate to be fully cured before the composite product exits the mold or the extrusion cooling system. The temperature of activation of the resin may be any suitable temperature, such as, e.g., the melting temperature of the thermoplastic, the glass transition temperature of the thermoplastic, or any suitable temperature therebetween.

With sufficient amounts of long fiber reinforcement in the board, the structural part of the board can also be made from an extruded or molded composite of natural or synthetic particles. Particles, as used herein, generally have aspect ratios of about 1:1 to about 2:1. The diameters of the particles may include nanometer diameters to about 0.25 inch. In various embodiments, particles include wood, rice hulls, wheat straw dust, fly ash, calcium carbonate, ground recycled asphalt shingles, mica, clay, nanoclay, or talc. It will be appreciated that in applications where the exposed part of a board is coated or not exposed to light or fire, any additives (e.g., UV stabilizers, pigments, and/or fire retardants) may be excluded.

In embodiments including particle reinforcement instead of short natural fibers, a larger quantity of long fibers may be necessary to achieve the desired properties.

In various embodiments, the board may include indentations or tongue & groove features to allow fastening with adjoining boards or supports.

An exemplary formulation for the structural part of the boards may include 60% kenaf fiber, 2% iron oxides and other mixed metal oxides (MMO's) pigments, 0.1% synergistic hindered amine light stabilizers, 0.05% phenolic antioxidant, 0.05% phosphite heat stabilizer, 3% magnesium hydroxide fire retardant, 1% zinc borate fungicide and about 2% maleic anhydride grafted polyethylene coupling agent. The balance may include high density polyethylene (which may be recycled, virgin, or a blend of recycled and virgin polyethylene). In such embodiments, inorganic pigments include iron oxides and other mixed metal oxides (MMO's), zinc ferrite, carbon black, titanium dioxide, or a mixture thereof. The pigments, light stabilizers, and fire retardant may be omitted if a shell (e.g., capstock) or veil is used on the product. The foam on the interior may be low-density polyethylene foam pigmented to match the exposed top and side surfaces of the board.

In various embodiments suitable for decking, boards may have dimensions of about 5.5" wide and 1.5" tall with a shell thickness of about 3/16" inch.

To prepare such boards according to exemplary methods, any of the ingredients may be blended together in, e.g., a twin screw extruder or banbury type batch mixer. A shell, if any, may be extruded over the exterior of the part with a single-screw co-extruder. A foam interior may be made by co-extrusion of blow-molding grade polyethylene with a blowing agent such as Reedy Safoam. In various embodiments, a long, continuous glass fiber reinforcement (about 5 wt % of the composite) may be pulled through a die with the molten polymer (e.g., polyethylene) composite during extrusion similar to that during a polyester pultrusion operation. Synthetic glass fibers may be preferable where fire resistance is important. In various embodiments, natural fibers may be used instead of glass fibers.

With reference now to FIG. 1, an exemplary hollow deck board 100 with long fiber reinforcement is illustrated. Deck board 100 includes a frame 101 comprising a high bending modulus, high strength, natural fiber thermoplastic composite material as described above. Board 100 includes three hollow areas 102 that, optionally, may be filled with a low-density foam. The board 100 may, optionally or additionally, include a shell 103 covering the exposed sides (e.g., top, bottom, and/or sides). Long fiber reinforcement may be incorporated into the frame 101 to reinforce specific regions 104 of the board 100 for, e.g., structural loads and/or long spans between joists. The board 100 further includes grooves 105 on one or both of the sides to facilitate fastening to the joist, e.g., with 'hidden' fasteners.

Figure 2:
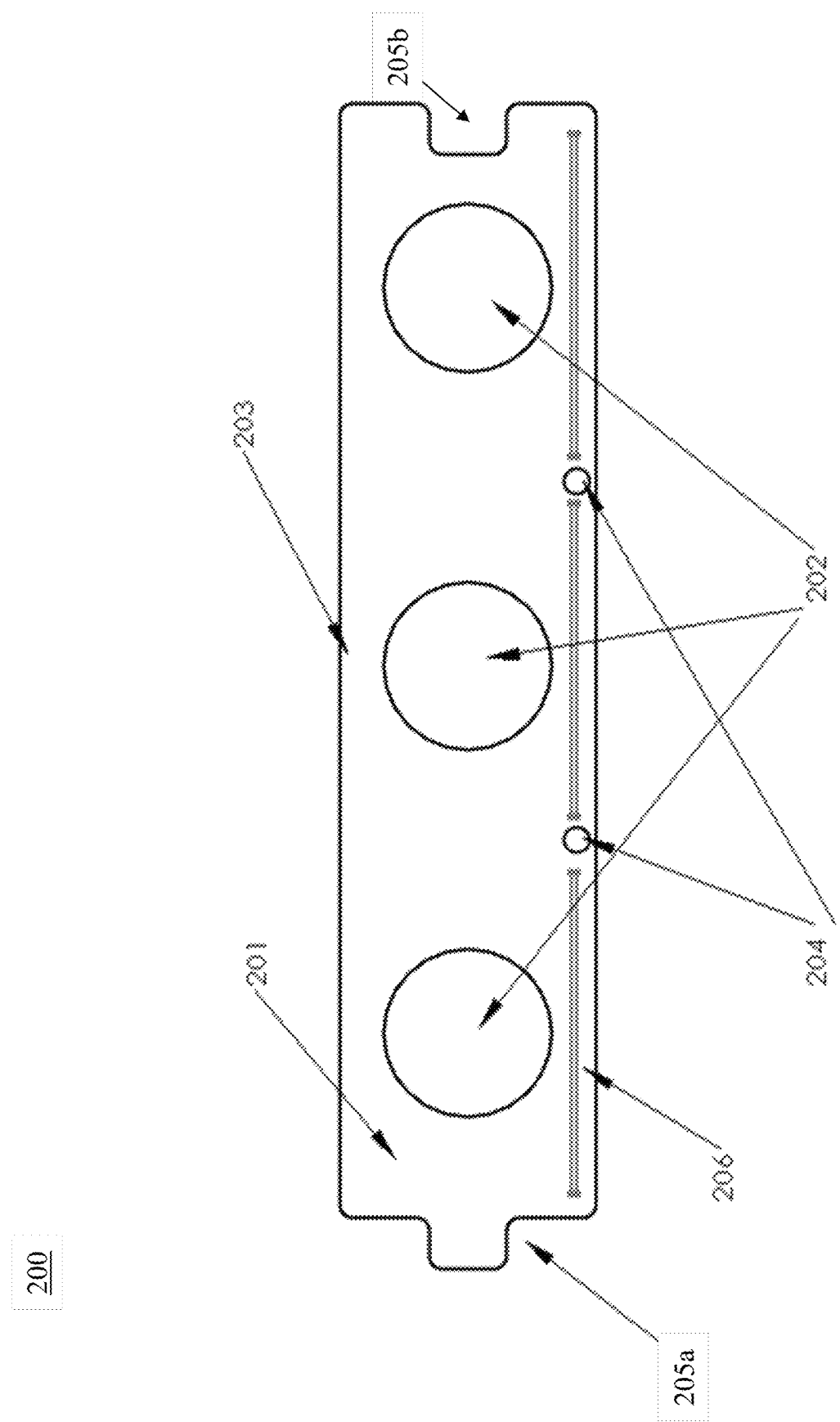
FIG. 2 is a cross-sectional view of a deck board with cylindrical hollow sections according to embodiments of the present disclosure.

With reference now to FIG. 2, an exemplary deck board 200 with cylindrical hollow sections is illustrated. Board 200 includes a high modulus and high strength thermoplastic natural fiber composite frame 201 with cylindrical hollow areas 202 that, optionally, may be filled with low density foam. In various embodiments, exposed surface 203 may include a wood grain embossing. Long-fiber reinforcement may be incorporated into the frame 201 to reinforce specific regions 204. Tongue 205a and groove 205b features increase the deck loading capabilities and provide for mounting or interlocking. Additional reinforcement fabrics may also be added to specific regions 206

Figure 3:
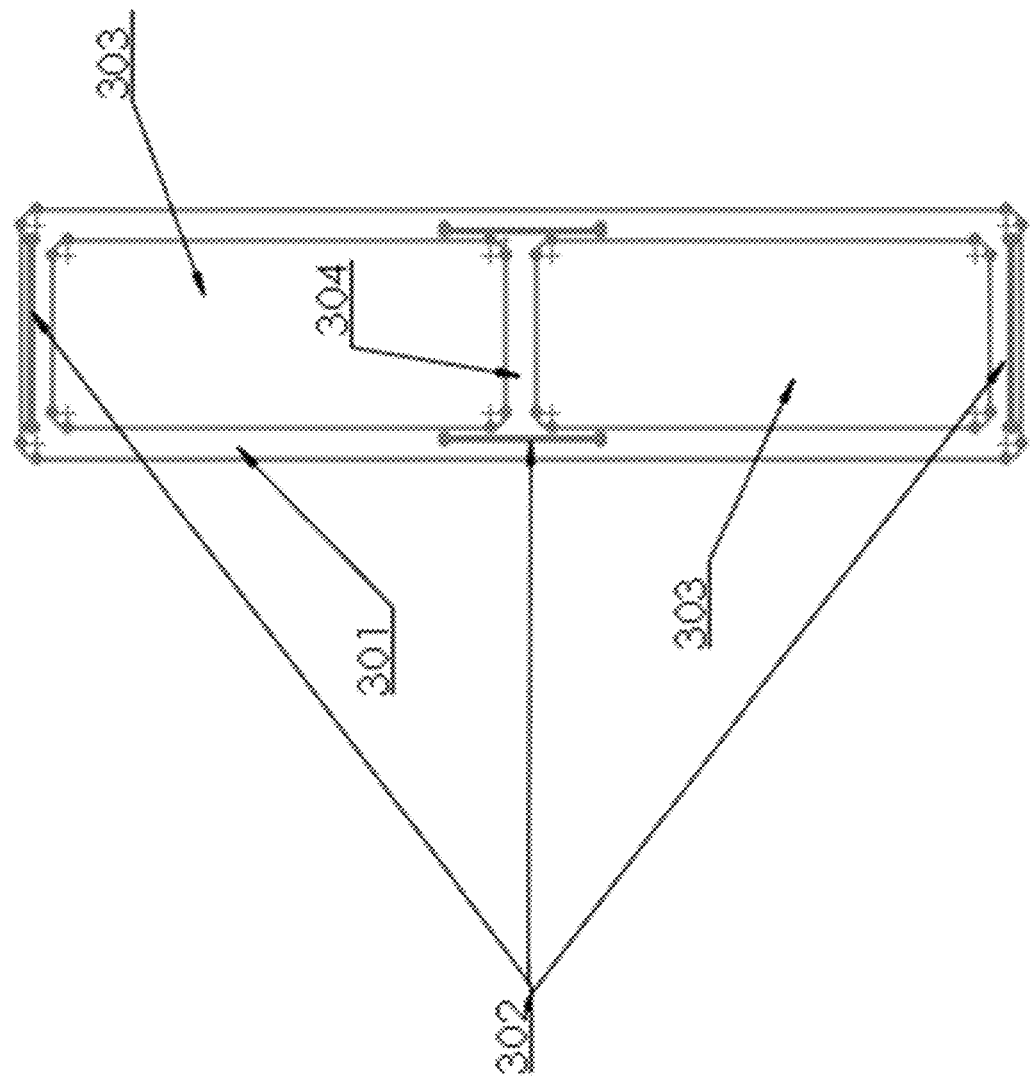
FIG. 3 is a cross-sectional view of a joist according to embodiments of the present disclosure.

With reference now to FIG. 3, an exemplary joist is illustrated. Joist 300 includes a frame 301 made of high strength and high modulus thermoplastic natural fiber composite as described above. Joist 300 may, optionally, include specific regions 302 of long fiber reinforcement and/or a foam-filled hollow areas 303. Joist 300 also includes a horizontal rib 304 for structural stability. In various embodiments, the joist 300 does not include any horizontal ribs.

Natural Fiber-Reinforced Polymer Lap Siding

Lap siding is typically installed by nailing siding boards to the side of, e.g., a house. In various embodiments, lap siding boards are nailed or screwed at specific intervals, e.g., every 16 to 24 inches, on the side of the house and nailed at the top portion while leaving the bottom portion unfastened. The exposed portion of the board overlaps and hides the nailed portion of the board below. With changes in temperature and/or moisture content, high internal compressive stresses may develop in the siding boards, thus resulting in buckling and stress-wrinkling in the siding. Low-cost thermoplastic materials typically do not have sufficiently low thermal expansion and high enough Young's modulus to prevent this buckling or stress-wrinkling.

To address these and other disadvantages of alternative approaches, the present disclosure provides for low-cost, lightweight lap siding boards made of a composite of thermoplastics and natural fibers having a sufficiently low thermal expansion and high modulus of elasticity to prevent buckling or stress-wrinkling. Moreover, the fiber-reinforced materials described herein allows for the installation of longer boards than previously commercially available.

In various embodiments, the structural part of the panels is made from an extruded or molded composite of natural fibers and thermoplastics. In various embodiments, synthetic fibers may be substituted or used in combination with the natural fibers. According to various embodiments, natural fibers and/or fabrics may include jute, wood, flax, kenaf, cotton, hemp, nanocellulose, bamboo, cellulose, ramie, banana, pineapple, or sisal and synthetic fibers and/or fabrics may include nylon, Kevlar, nylon, basalt, glass, carbon, or polyester. According to various embodiments, thermoplastics include polyolefins, nylon, PVC, PLA or polyesters. Various embodiments have fibers with an aspect ratio of greater than about 5:1. Some such embodiments have fibers with an aspect ratio of greater than about 20:1. Some such embodiments have fibers with an aspect ratio of greater than about 100:1.

The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10^{-5}/°$ F. In some embodiments, the CLTE is less than about $1 \times 10^{-5}/°$ F. As described below, further addition of long fiber reinforcement increases the MOE and MOR and decreases the CLTE.

A panel according to various embodiments may be hollow and may include horizontal and/or vertical ribs as necessary for structural requirements. In various embodiments, the natural fiber composite formulation includes additives such as pigments, UV light stabilizers, antioxidants, heat stabilizers, fungicides, coupling agents, lubricants, processability improvers, or fire retardants. In various embodiments, the natural fiber composite may include one or more coatings. It will be appreciated that in applications where the exposed part of a board is coated or not exposed to light or fire, the UV stabilizers, pigments, or fire retardants may be excluded.

In various embodiments, pigments include iron oxides and other mixed metal oxides (MMO's) zinc ferrite, carbon black, diazonium salts, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate, microban, or microban-type compounds. In various embodiments, coupling agents include maleated polyolefins, or Maleic anhydride grafted styrene-ethylene-butylene-styrene block copolymer (SEBS-g-MA). In various embodiments, fire retardants include magnesium hydroxide, alumina trihydrate, or borates. Other suitable additives and/or coatings useful in composite manufacturing will be apparent to one skilled in the art upon consideration of this disclosure.

In various embodiments, any hollow portions of the panels (if present) may be filled by co-extrusion or post extrusion injection with a low-density foam. These foams can be made from polymers such as polyolefins that have chemical blowing agents or are saturated with gas or thermoset polymers, such as polyurethane. In various embodiments, polyolefins include polypropylene, polyethylene, or low density polyethylene. These foams can be pigmented, for example, with iron oxides and other mixed metal oxides (HMO's), zinc ferrite, carbon black, or titanium dioxide to match the top and side surfaces of the board. Similar to the parts described above, the foams may likewise include UV stabilizers, antioxidants, or fire retardants. In various embodiments, low-density foams may include syntactic foams made from a blend of materials, e.g., polyolefins blended with glass microspheres or thermoset resin(s) and catalysts blended with glass microspheres. In various embodiments, pigments, UV stabilizers, antioxidants, and/or fire-retardants may also be blended into the syntactic foam mixture.

In various embodiments, any exposed surfaces (e.g., top and/or side surfaces) may include a coextruded shell (e.g., capstock) comprised of thermoplastics pigmented to mimic colors of various types of wood. In various embodiments, thermoplastics include ASA, acrylic, fluoropolymer, polyolefin, or PVC. In various embodiments, suitable pigments include iron oxides and other mixed metal oxides (MMO's), zinc ferrite, carbon black, or titanium dioxide. The exposed surface can be embossed with a wood-grain or other texture or have a molded-in or co-extruded veil with a wood-grain or other appearance. The exposed surface can also be painted or primed after surface pretreatment with flame or plasma pre-treatment.

In various embodiments, the structural part of the panel is reinforced as necessary to prevent expansion or contraction due to changes in temperature or moisture content. In various embodiments, stiffness is improved with long natural or synthetic fiber bundles, or woven or non-woven fabrics. According to various embodiments, natural fibers and/or fabrics may include jute, wood, flax, kenaf, cotton, hemp, nanocellulose, bamboo, cellulose, ramie, banana, pineapple, or sisal and synthetic fibers and/or fabrics may include nylon, Kevlar, basalt, glass, carbon, or polyester.

In various embodiments, predetermined amounts of long fibers are included in strategic locations to complement the structural capabilities of the short-fiber reinforced composite. In various embodiments, long fibers may make up between about 5% to about 25% of the composite part. These fibers can be introduced into the extrusion with a cross-head die or laid into the mold for compression molded products.

To provide additional stiffness and strength, the long fiber fabric or strands can be impregnated or coated with a thermoset resin system such as polyurethane, epoxy, or polyester before the fibers are pulled into the die or placed in the mold. In various embodiments, an appropriate catalyst is also introduced. Contact with the high temperature thermoplastic composite activates and cures the thermoset resin. Various thermoset resin systems are available, and a suitable resin may be selected for each application such that it is activated at the temperature of the molten thermoplastic composite, and reacts at a sufficient rate to be fully cured before the composite product exits the mold or the extrusion cooling system. The temperature of activation of the resin may be any suitable temperature, such as, e.g., the melting temperature of the thermoplastic, the glass transition temperature of the thermoplastic, or any suitable temperature therebetween.

In various embodiments, the panel may include a bevel.

With sufficient amounts of long fiber reinforcement in the panel, the structural part of the panel can also be made from an extruded or molded composite of natural or synthetic particles. Particles may include aspect ratios of about 1:1 to about 2:1. The diameters of the particles may include nanometer diameters to about 0.25 inch. In various embodiments, particles include wood, rice hulls, wheat straw dust, fly ash, calcium carbonate, ground recycled asphalt shingles, mica, clay, nanoclay, or talc. It will be appreciated that in applications where the exposed part of a panel is coated or not exposed to light or fire, any additives (e.g., UV stabilizers, pigments, and/or fire retardants) may be excluded.

In embodiments including particle reinforcement instead of short natural fibers, a larger quantity of long fibers may be necessary to achieve the desired properties.

In various embodiments, panels may be tapered to function as lap siding, with about ⅛" thickness at the headlap and about ½ to about ¾" thickness at the butt edge. Various embodiments are 4 to 12" wide with lengths up to 20 feet.

An exemplary formulation for the structural part of the panels may include 60% kenaf fiber, 3% inorganic pigment, 0.1% HALS UV stabilizer, 0.1% antioxidant, 5% magnesium hydroxide fire retardant, 1% zinc borate fungicide and about 2% maleic anhydride grafted polypropylene coupling agent. The balance may include polypropylene (which may be recycled, virgin, or a blend of recycled and virgin polypropylene). In such embodiments, inorganic pigments include iron oxides and other mixed metal oxides (MMO's), zinc ferrite, carbon black, titanium dioxide, or a mixture thereof. The pigments, light stabilizers, and/or fire retardant may be omitted if the product is painted or a shell is co-extruded on the product. The foam on the interior is a low-density polypropylene foam pigmented to match the exposed surface of the board.

In various embodiments suitable for siding, panels/boards are about 8" tall with a ⅝" inch bottom-edge allowing the panel to sit at an angle when positioned against a flat surface, such as the surface of a house.

To prepare such boards according to exemplary methods, any of the ingredients described above may be blended together in, e.g., a twin screw extruder or banbury type batch mixer. A shell (e.g., capstock) may be extruded over the exterior of the part with a single-screw co-extruder. A foam interior may be made by co-extrusion of blow-molding grade polypropylene with a blowing agent such as Reedy Safoam. In various embodiments, a long, continuous glass fiber reinforcement (about 5 wt % of the composite) may be pulled through a die with the molten polymer (e.g., polypropylene) composite during extrusion similar to that during a polyester pultrusion operation. In various embodiments, natural fibers may be used. In various embodiments, synthetic glass fibers may be used, for example, where fire resistance is important.

Figure 4:
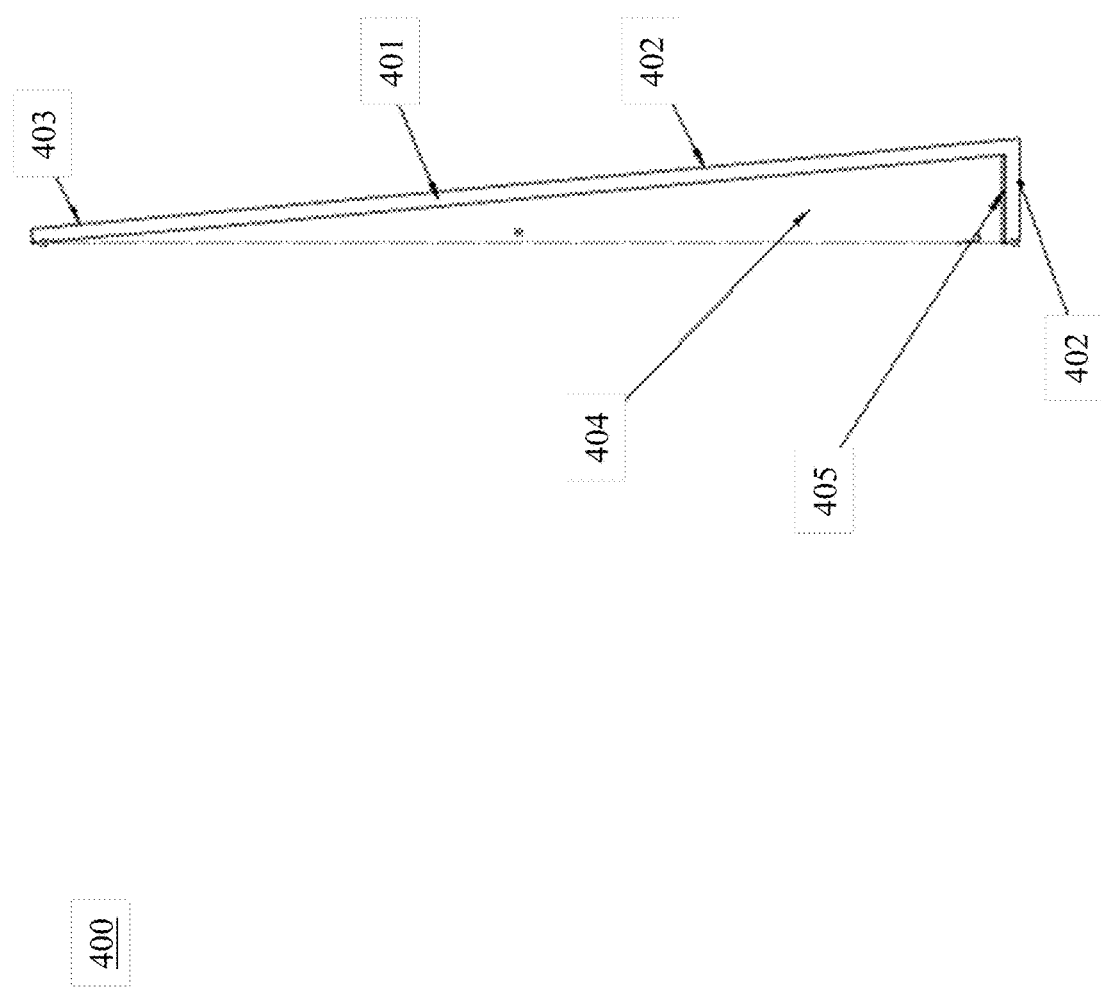
FIG. 4 is a cross-sectional view of a beveled siding board with an open back according to embodiments of the present disclosure.

With reference now to FIG. 4, an exemplary siding board 400 with an open back is illustrated. Siding boar 400 has a substantially L-shaped frame 401 and is made of a high modulus, low CLTE thermoplastic and natural fiber composite material as described above. Exposed portion 402 may include a shell (e.g., capstock), veil, embossed texture, or coating. Board 400 is nailed in the top about 1.5" headlap area 403. The back 404 of the panel 400 is open and the void may be filled with e.g., a polymer foam. Long fibers can be incorporated on the back surface 405 for reinforcement by, for example, calendering. In various embodiments, woven and/or non-woven fiber may be co-extruded or calendered into the back of the siding before the siding is thermoformed into the desired shape.

Figure 5:
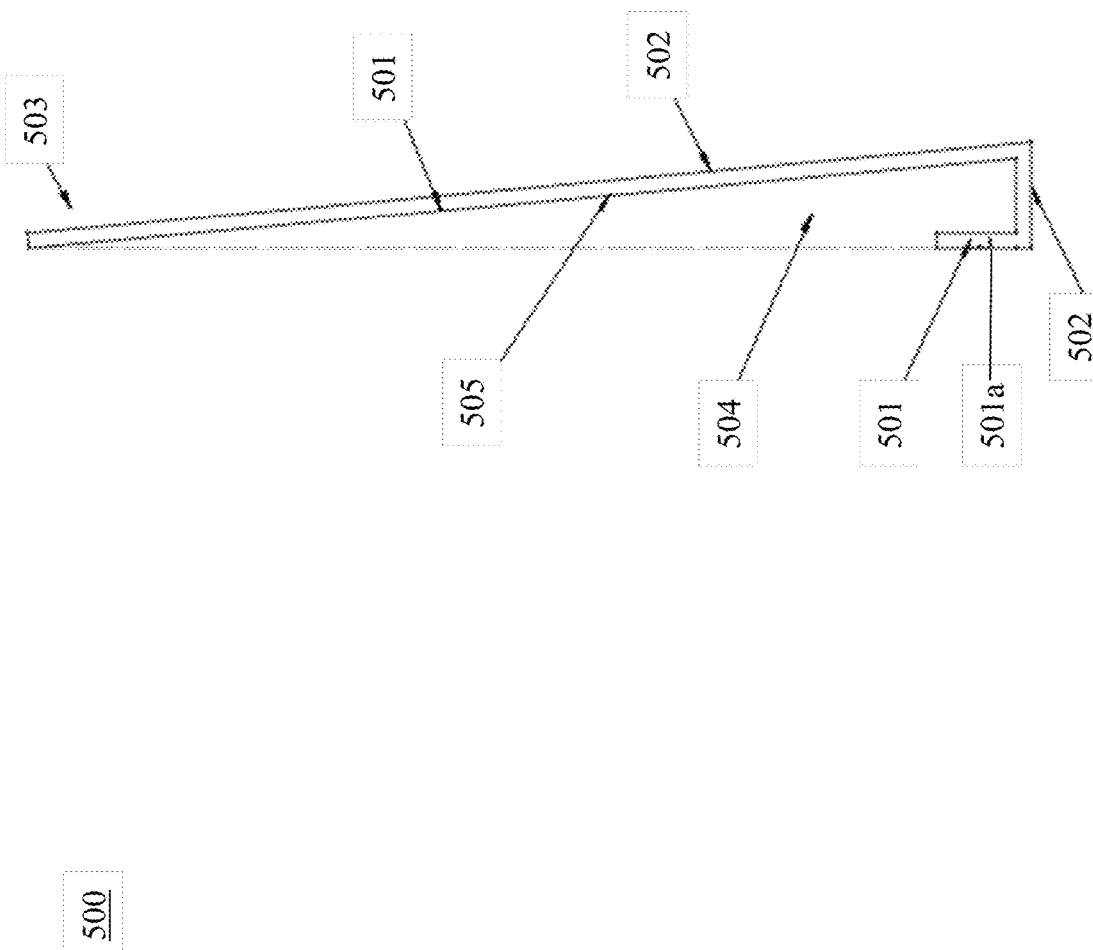
FIG. 5 is a cross-sectional view of a beveled siding board with a bottom lip according to embodiments of the present disclosure.

With reference now to FIG. 5, an exemplary siding board with a bottom lip is illustrated. Siding board 500 has a substantially L-shaped frame 501 and is made of a high modulus, low CLTE thermoplastic and natural fiber composite material. Structure 501 further includes a hook portion 501a. Exposed portion 502 may include a shell (e.g., capstock), veil, embossed texture, or coating. Board 500 is nailed in the top about 1.5" headlap area 503. The back 504 of the panel 500 is open and the void may be filled with, e.g., a polymer foam. Long fibers can be incorporated on the back surface 505 for reinforcement by, for example, calendering. In various embodiments, woven and/or non-woven fiber may be co-extruded or calendered into the back of the siding before the siding is thermoformed into the desired shape.

Figure 6:
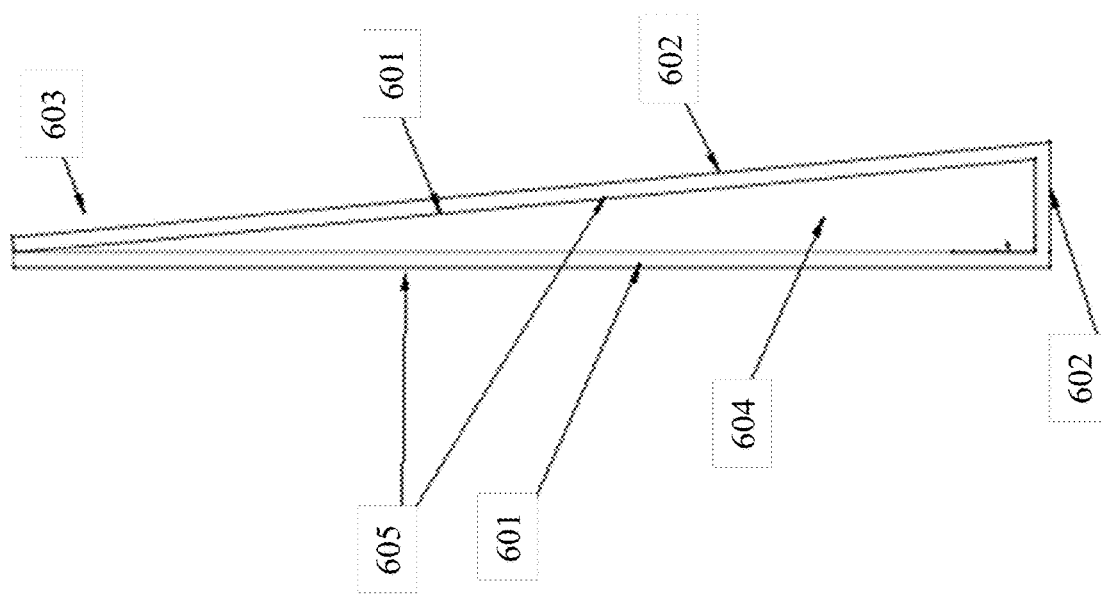
FIG. 6 is a cross-sectional view of a beveled siding board with a closed cross-section according to embodiments of the present disclosure.

With reference now to FIG. 6, an exemplary siding board 600 with a closed cross-section is illustrated. Siding board 600 is made of a high modulus, low CLTE thermoplastic natural fiber composite frame 601. Exposed portion 602 may include a shell (e.g., capstock), veil, embossed texture, or coating. Board 600 is nailed in the top about 1.5" headlap area 603. Structure 601 encloses hollow area 604 and the hollow area may be filled with, e.g., a polymer foam. Long fibers can be incorporated on the back surface 605 for reinforcement by, for example, calendering. In various embodiments, woven and/or non-woven fiber may be co-extruded or calendered into the back of the siding before the siding is thermoformed into the desired shape.

Figure 7:
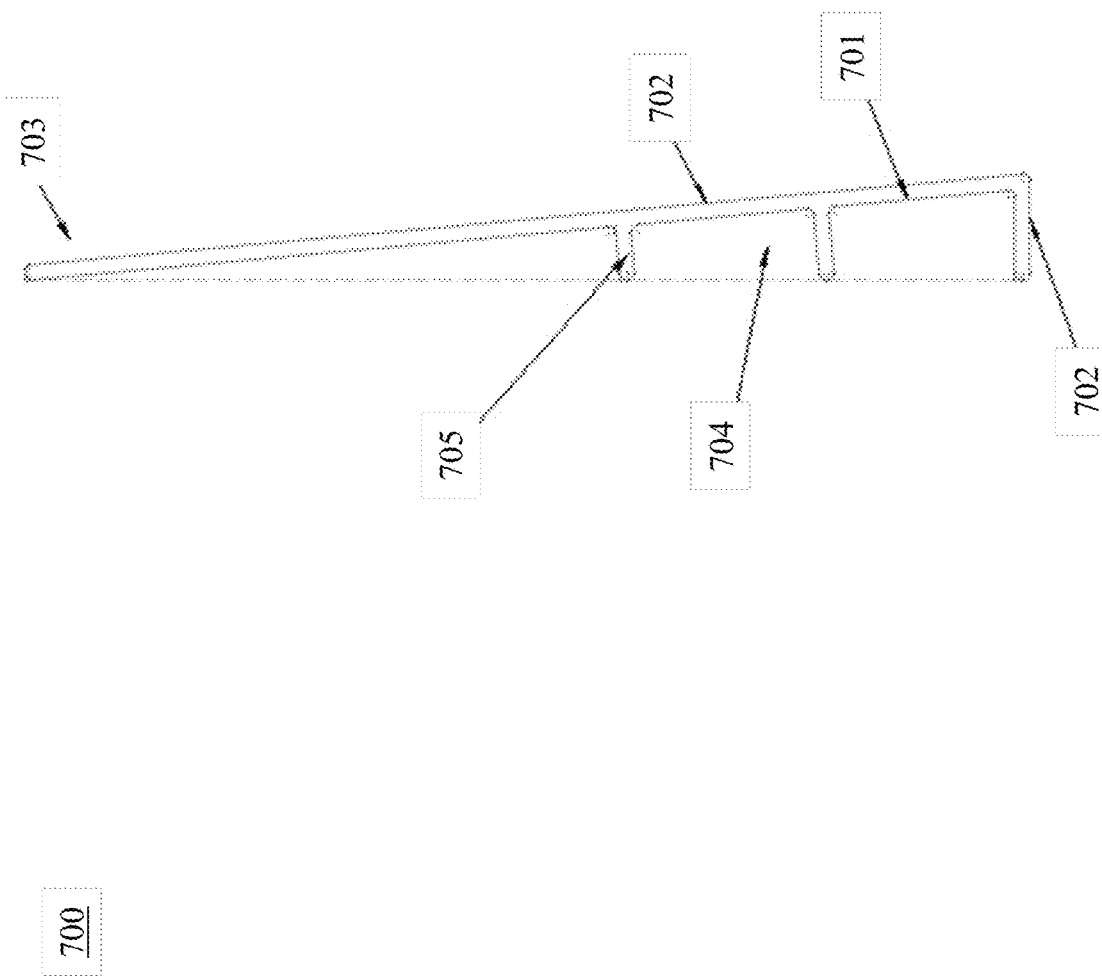
FIG. 7 is a cross-sectional view of a beveled siding board with horizontal ribs according to embodiments of the present disclosure.

With reference now to FIG. 7, an exemplary beveled siding board with horizontal ribs is illustrated. Siding panel 700 has a substantially L-shaped frame 701 and is made of a high modulus, low CLTE thermoplastic natural fiber composite material. Exposed portion 702 may include a shell (e.g., capstock), veil, embossed texture, or coating. Board 700 is nailed in the top about 1.5" headlap area 703. The back 704 of the board 700 includes several horizontal ribs 705. The back 704 is otherwise open and the voids may be filled with a foamed polymer. Long fibers can be incorporated on the back surface 705 for reinforcement by, for example, calendering. In various embodiments, woven and/or non-woven fiber may be co-extruded or calendered into the back of the siding before the siding is thermoformed into the desired shape.

Figure 8:
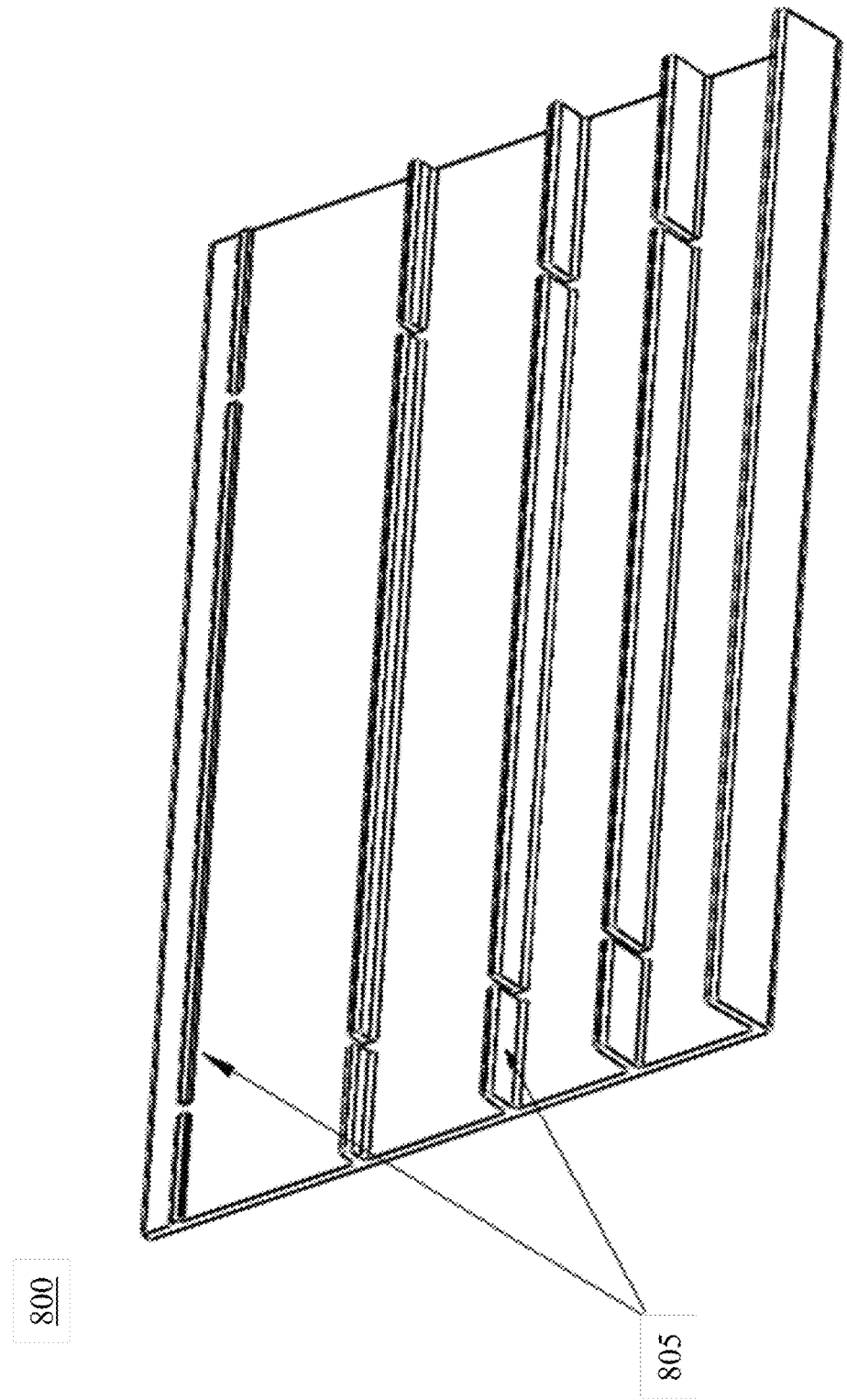
FIG. 8 is a rear perspective view of the siding board of FIG. 7.

With reference to FIG. 8, a rear view of the board of FIG. 7 is shown. Ribs 805 include optional notches to provide ventilation between the siding and sheathing to prevent condensation.

Figure 9:
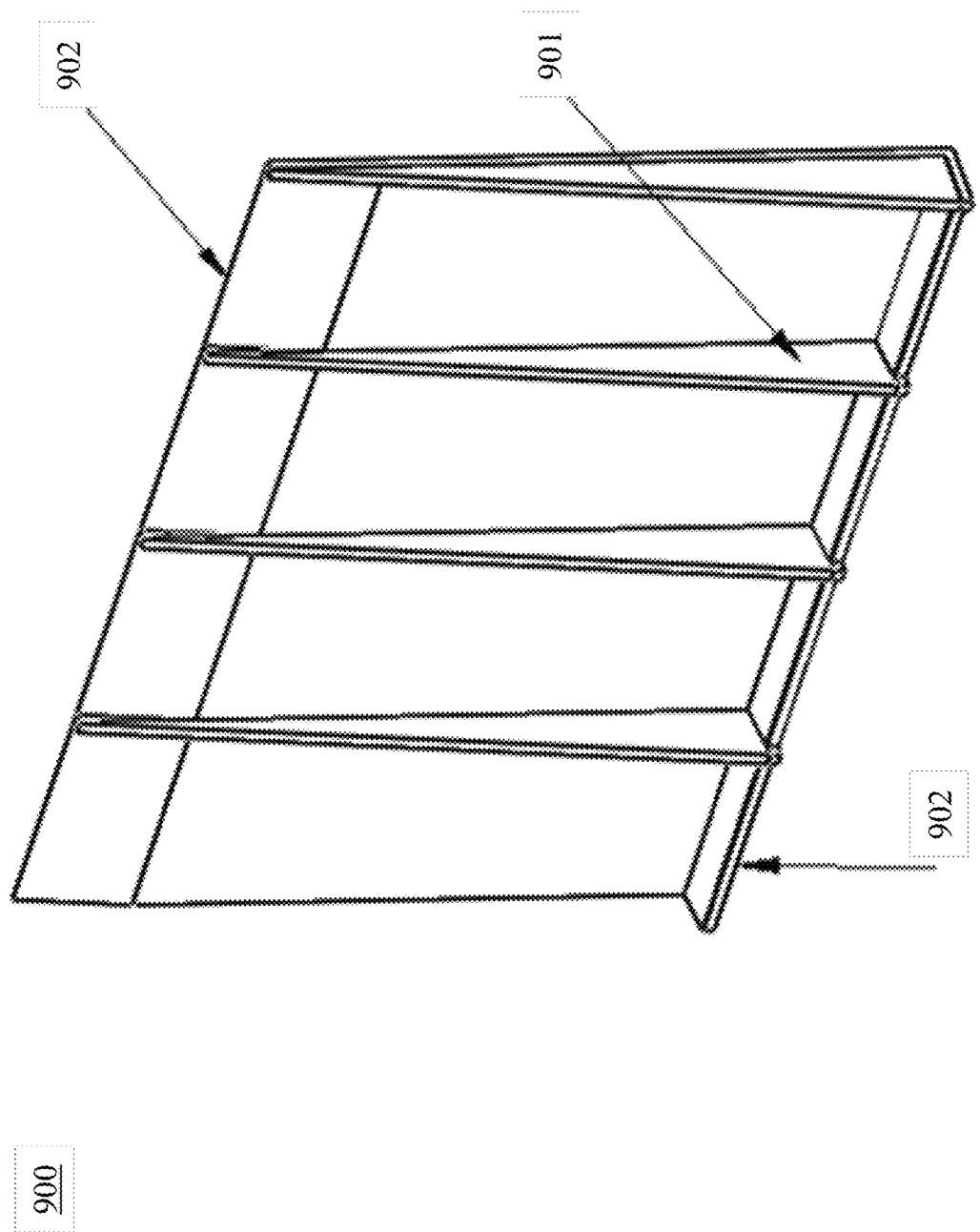
FIG. 9 is a cross-sectional view of a molded beveled siding board with vertical ribs according to embodiments of the present disclosure.

With reference now to FIG. 9, a molded siding panel with vertical ribs is illustrated. The back of siding panel 900 includes vertical ribs 901 instead of horizontal ribs. Without the need for vertically oriented battens, vertical ribs 901 with open areas 902 facilitate ventilation between the home sheathing and the siding to prevent water condensation.

Natural Fiber-Reinforced Polymer Railroad Ties

Low cost materials used in railroad ties such as plastic and wood plastic composites have low strength and stiffness, requiring profiles to be solid in composition. Higher performance materials that can be used in structural applications are more expensive and require hollow profiles to be competitive in price. Hollow profiles present problems in fastening, terminating cut ends, and supporting the loads over rail mounting areas.

To address these and other disadvantages of alternative approaches, the present disclosure provides for low-cost, lightweight railroad ties made of a composite of thermoplastic and natural fibers that have sufficiently high modulus of elasticity and strength to make a hollow profile that is competitive in price with low-cost, plastic or wood plastic composite solid railroad ties.

In various embodiments, the structural part of the railroad tie is made from an extruded or molded composite of natural or synthetic fibers and thermoplastics. According to various embodiments, natural fibers include jute, wood, flax, kenaf, cotton, hemp, nanocellulose, bamboo, cellulose, ramie, banana, pineapple, sisal, glass, or basalt. In various embodiments, synthetic fibers such as nylon, Kevlar, nylon, polyester, basalt, glass or may be substituted or used in combination with the natural fibers. According to various embodiments, thermoplastics include polyolefins, nylon, PVC, PLA, or polyesters. Various embodiments have fibers with an aspect ratio of greater than about 5:1. Some such embodiments have fibers with an aspect ratio of greater than about 20:1. Some such embodiments have fibers with an aspect ratio of greater than about 100:1.

The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10^{-5}/°$ F. In some embodiments, the CLTE is less than about $1 \times 10^{-5}/°$ F. As described below, further addition of long fiber reinforcement increases the MOE and MOR and decreases the CLTE.

A railroad tie according to various embodiments is hollow with horizontal or vertical ribs as necessary for structural requirements. In various embodiments, the natural fiber composite formulation includes additives such as pigments, UV light stabilizers, antioxidants, heat stabilizers, fungicides, coupling agents, lubricants, processability improvers, or fire retardants. In various embodiments, the natural fiber composite may include one or more coatings. It will be appreciated that in applications where the exposed part of a railroad tie is coated or not exposed to light or fire, the UV stabilizers, pigments, or fire retardants may be excluded.

In various embodiments, pigments include iron oxides and other mixed metal oxides (MMO's), zinc ferrite, carbon black, diazonium salts, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate, microban, or microban-type compounds. In various embodiments, coupling agents include maleated polyolefins, or Maleic anhydride grafted styrene-ethylene-butylene-styrene block copolymer (SEBS-g-MA). In various embodiments, fire retardants include magnesium hydroxide, alumina trihydrate, or borates. Other suitable additives and/or coatings useful in composite manufacturing will be apparent to one skilled in the art upon consideration of this disclosure.

In various embodiments, the structural part of the railroad tie is reinforced as necessary to prevent expansion or contraction due to changes in temperature or moisture content. In various embodiments, stiffness is improved with long natural or synthetic fiber bundles, or woven or non-woven fabrics. According to various embodiments, natural fibers and/or fabrics may include jute, wood, flax, kenaf, cotton, hemp, nanocellulose, bamboo, cellulose, ramie, banana, pineapple, or sisal and synthetic fibers and/or fabrics may include nylon, Kevlar, nylon, polyester, basalt, glass, carbon, or polyester.

In various embodiments, very small amounts of long fibers are included in strategic locations to complement the structural capabilities of the short-fiber reinforced composite. These fibers can be introduced into the extrusion with a cross-head die or laid into the mold for compression molded products.

To provide additional stiffness and strength, the long fiber fabric or strands can be impregnated or coated with a thermoset resin system such as polyurethane, epoxy, or polyester before the fibers are pulled into the die or placed in the mold. In various embodiments, an appropriate catalyst is also introduced. Contact with the high temperature thermoplastic composite activates and cures the thermoset resin. Various thermoset resin systems are available, and a suitable one may be selected for each application such that it is activated at the temperature of the molten thermoplastic composite, and reacts at a sufficient rate to be fully cured before the composite product exits the mold or the extrusion cooling system.

With sufficient levels of long fiber reinforcement, the structural part of the railroad tie can also be made from an extruded or molded composite of natural or synthetic particles. In various embodiments, particles include wood, rice hulls, wheat straw dust, fly ash, calcium carbonate, ground recycled asphalt shingles, mica, clay, nanoclay, or talc. In various embodiments, the composite formulation includes additives such as pigments, UV light stabilizers, antioxidants, heat stabilizers, fungicides, coupling agents, or fire retardants. It will be appreciated that in applications where the exposed part of a board is coated or not exposed to light or fire, the UV stabilizers, pigments, or fire retardants may be excluded.

In embodiments including particle reinforcement instead of short natural fibers, a larger quantity of long fibers will be necessary to achieve the desired properties.

In various embodiments, the extruded tie has vertical or horizontal axial ribs for structural stability. A molded tie may have vertical or horizontal ribs axially or transverse as needed for structural stability. The ties can also have textured surfaces in contact with the rock ballast to help resist lateral movement of the ties installed on curves. The open I-beam tie resists lateral movement due to rock ballast naturally filling the voids during installation.

In various embodiments, the area of the tie where the tie-plate is mounted and the rails pass over incorporates a low-cost material to allow tie-plate mounting and withstand the shock, vibration, impact, and compression when a train car is passing over the tie. For the extruded rectangular profile, this area can be filled post-extrusion by pouring, injecting or inserting through the open end a suitable material into the hollow area where the tie plate is mounted. For an I-beam type of structure, a suitable material may be compression molded with the tie, or bolted or screwed to the web after molding. The material where the tie-plate is molded has a similar coefficient of thermal expansion to the shell or I-beam material, so as not to cause excessive stress on the shell during natural diurnal thermal cycling. Alternatively, the material may be inserted with a sufficiently thick elastomeric sealant to absorb any thermal stresses.

These blocks are inserted with a sealant such as a butyl-based or flexible polyurethane adhesive. The blocks are sized to extend just past the rail mounting area with sufficient length to distribute stress adequately to the shell composite from the rail mounting tie-plate.

Suitable materials for use in the tie-plate area include polyolefin foams, polyurethane foams, nylon foams, or syntactic polyolefin foams. In other embodiments, the material may be pure thermoplastic, wood, or other natural fiber composite. The composition of the material below the tie plate can also be a composite of natural or synthetic rubber and polyolefins.

An exemplary formulation for the structural part of the boards may include about 60% kenaf fiber, about 1% carbon black, 0.1% HALS UV light stabilizer, 0.1% antioxidant/heat stabilizer, 1% zinc borate fungicide, and 2% maleic anhydride grafted polyethylene coupling agent. The balance may include polyethylene (which may be recycled, virgin, or a blend of recycled and virgin polyethylene). The pigments, light stabilizers, and/or fire retardant may be omitted if a shell (e.g., capstock) is used on the product. The blocks inserted into the tie plate area comprise a compression molded composite of about 50% rice hulls, 48% recycled post-consumer HDPE, and 2% maleic anyhdride grafted HDPE.

Figure 10:
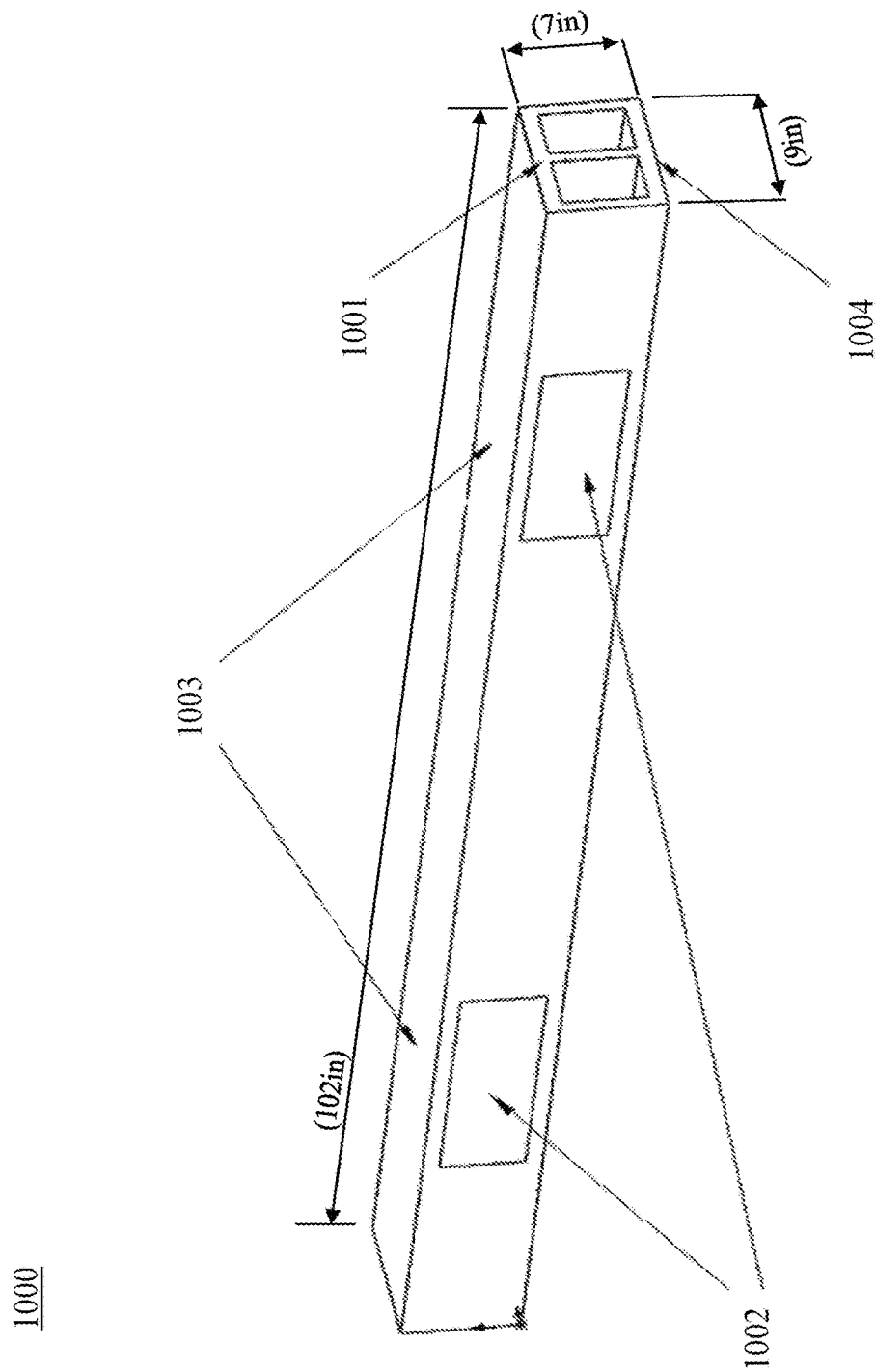
FIG. 10 is a perspective view of a hollow extruded railroad tie according to embodiments of the present disclosure.

With reference now to FIG. 10, an exemplary hollow extruded railroad tie is illustrated. Railroad tie 1000 is about 9" wide and 7" tall. Frame 1001 is made of a high strength and high bending modulus thermoplastic natural fiber composite. Support blocks 1002 may be inserted into the hollow tie in the hollow area 1003 where the tie plate and rails are attached. The bottom 1004 of the tie 1000 may include a textured surface to prevent lateral movement.

Figure 11:
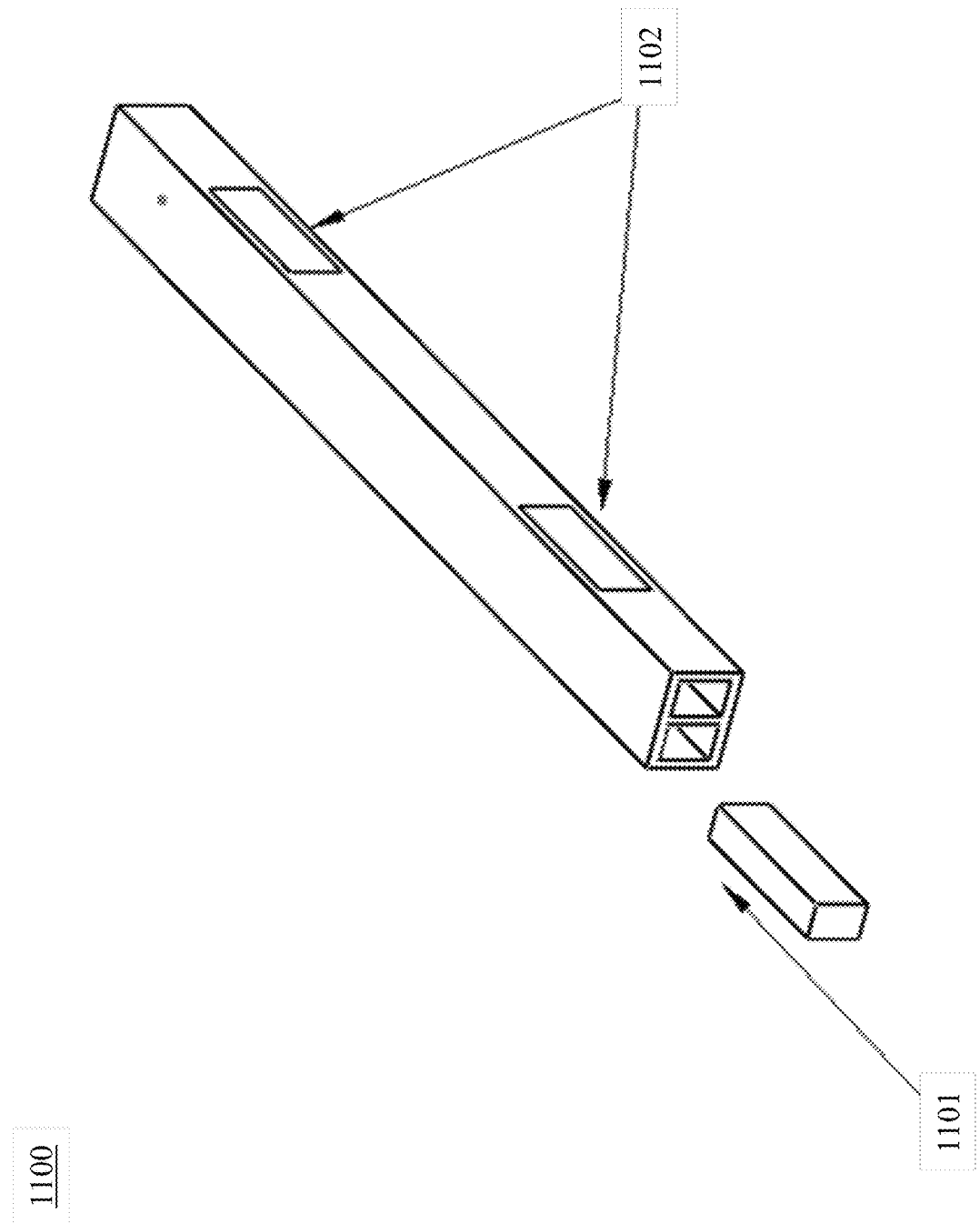
FIG. 11 is a perspective view of a hollow extruded railroad tie with inserts according to embodiments of the present disclosure.

With reference now to FIG. 11, an exemplary hollow extruded railroad tie 1100 with inserts is illustrated. Railroad tie 1100 includes an inserted block 1102 in each of the interior voids. In various embodiments, the railroad tie 1100 may be manufactured by extrusion, coextrusion, or overmolding or rotomolding.

Figure 12:
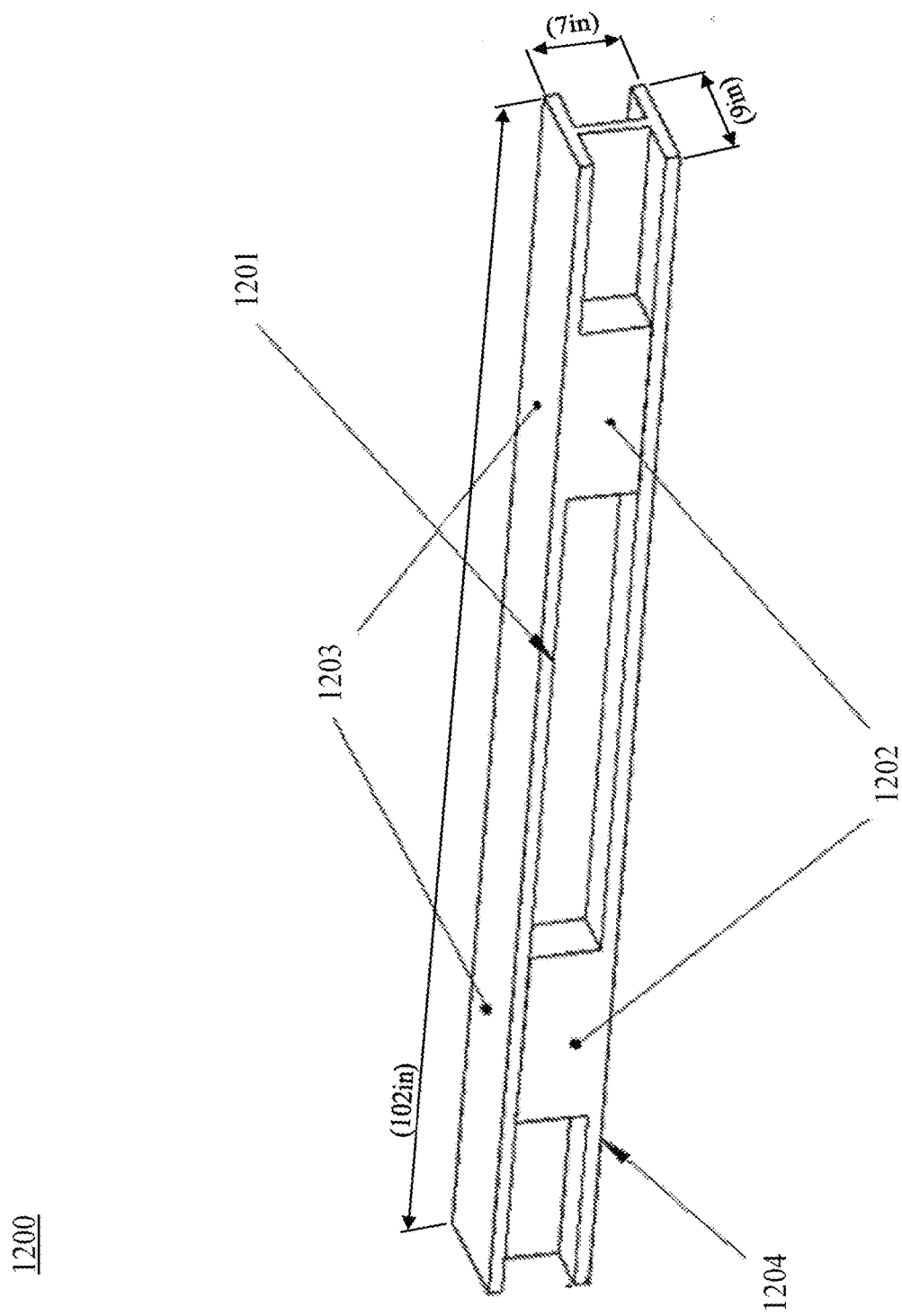
FIG. 12 is a perspective view of an I-beam railroad tie according to embodiments of the present disclosure.

With reference now to FIG. 12, an exemplary I-beam railroad tie is illustrated. The I-beam tie 1200 includes a frame 1201 and is made of a high modulus and high strength thermoplastic natural fiber composite material. The area 1202/1203 where the tie plate is fastened may be molded out of the same material. Tie 1200 also may include a textured bottom surface 1204 to inhibit lateral movement. In various embodiments, the I-beam tie 1200 may be manufactured by compression molding.

Figure 13:
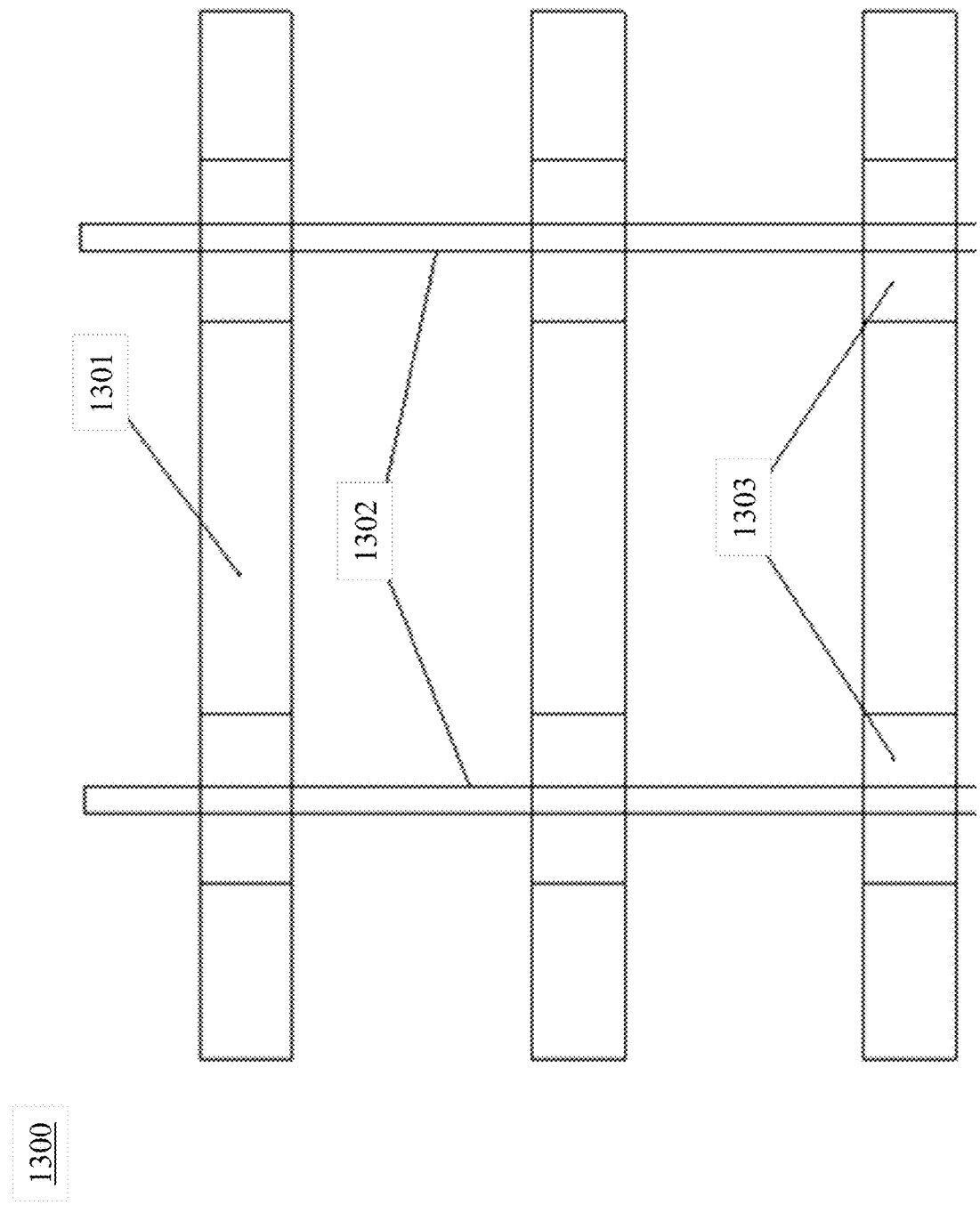
FIG. 13 is a top view of a railroad tie installation according to embodiments of the present disclosure.

With reference now to FIG. 13, a top view of a railroad tie installation 1300 is provided. Ties 1301 are made of a high modulus and high strength thermoplastic natural fiber composite as set out above. Rails 1302 pass over the ties and are fastened to tie plates 1303 which are in turn fastened to the tie. As described above, tie plates are fastened over an area that is designed to handle the stresses created when a train car passes over the track.

Figure 14:
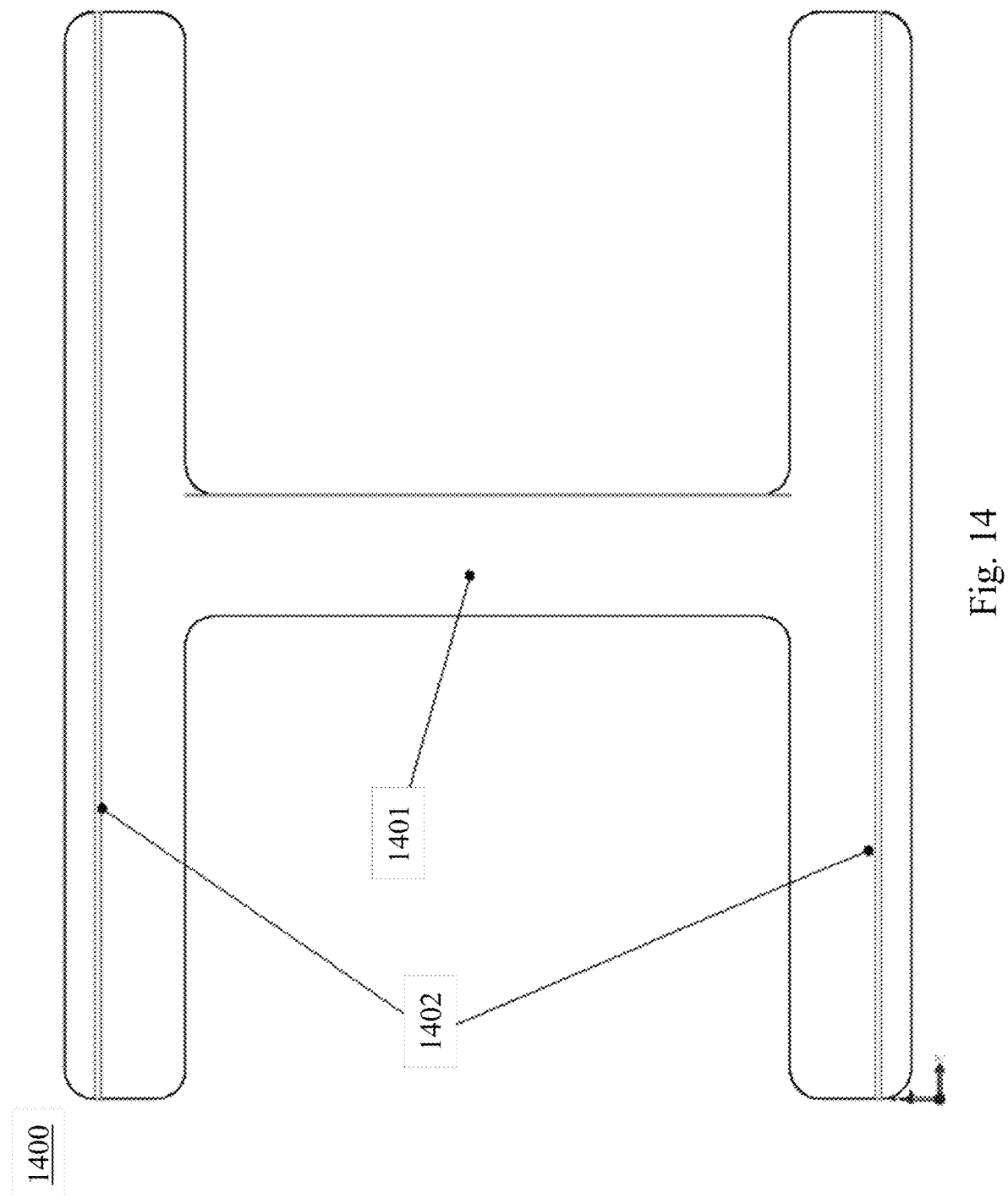
FIG. 14 is a cross-sectional view of an I-beam railroad tie according to embodiments of the present disclosure.

With reference now to FIG. 14, a cross-sectional view of an I-beam tie 1400 is provided. Tie 1401 comprises a high modulus and high strength natural fiber thermoplastic composite. Long fiber reinforcement may be provided in the flanges 1402.

Natural Fiber-Reinforced Polymer Roofing Panels

Standing seam roofing panels are typically made from thin coated steel that is expensive, susceptible to corrosion if the coating is compromised and requires special installation techniques to deal with the high coefficient of thermal expansion.

To address these and other disadvantages of metal standing seam roofing, the present disclosure provides for low-cost sheets made of a composite of thermoplastics and natural fibers that have a sufficiently low thermal expansion and high modulus of elasticity to prevent buckling or stress-wrinkling. The thru-chip composition will last longer than a coated product in real-life applications.

In various embodiments, the sheet is made from an extruded or molded composite of natural or synthetic fibers and thermoplastics. According to various embodiments, natural fibers include jute, wood, flax, kenaf, cotton, hemp, nanocellulose, bamboo, cellulose, ramie, banana, pineapple, sisal, glass, or basalt. In various embodiments, synthetic fibers such as nylon, Kevlar, basalt, glass or polyester may be substituted or used in combination with the natural fibers. According to various embodiments, thermoplastics include polyolefins, nylon, PLA, PVC, or polyesters. Various embodiments have fibers with an aspect ratio of greater than about 5:1. Some such embodiments have fibers with an aspect ratio of greater than about 20:1. Some such embodiments have fibers with an aspect ratio of greater than about 100:1.

The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10^{-5}/°F$. In some embodiments, the CLTE is less than about $1 \times 10^{-5}/°F$. As described below, further addition of long fiber reinforcement increases the MOE and MOR and decreases the CLTE.

In various embodiments, the natural fiber composite formulation includes additives such as pigments, UV light stabilizers, antioxidants, heat stabilizers, fungicides, coupling agents, or fire retardants.

In various embodiments, pigments include iron oxides and other mixed metal oxides (MMO's), zinc ferrite, carbon black, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate or microban. In various embodiments, coupling agents include maleated polyolefins, or Maleic anhydride grafted styrene-ethylene-butylene-styrene block copolymer (SEBS-g-MA). In various embodiments, fire retardants include magnesium hydroxide, alumina trihydrate, or borates. In various embodiments, suitable pigments include iron oxides and other mixed metal oxides (MMO's), zinc ferrite, carbon black, or titanium dioxide. The exposed surface can be embossed with a wood-grain or other texture. In various embodiments, the sheet is reinforced on the underside to both to prevent expansion or contraction due to changes in temperature or moisture content and act as a fire barrier. In various embodiments, the reinforcement is comprised of a woven or nonwoven fabric of glass or other non-flammable synthetic fiber, and fabrics include glass, basalt, or quartz.

These fabrics can be placed into the mold before introduction of the composite for compression or injection molded panels or calendered into one side of the panel before thermoforming into the desired shape. To provide additional stiffness and strength, the long fiber fabric can be impregnated or coated with a thermoset resin system such as polyurethane, epoxy, or polyester before the fibers placed in the mold. Contact with the high temperature thermoplastic composite activates and cures the thermoset resin. Various thermoset resin systems are available, and a suitable one may be selected for each application such that it is activated at the temperature of the molten thermoplastic composite, and reacts at a sufficient rate to be fully cured before the composite product exits the mold or the extrusion cooling system. With sufficient levels of long fiber fabric reinforcement, the roofing sheet can also be made from an extruded or molded composite of natural or synthetic particles. In various embodiments, particles include wood, rice hulls, wheat straw dust, fly ash, calcium carbonate, ground recycled asphalt shingles, mica, clay, nanoclay, or talc. In various embodiments, the composite formulation includes additives such as pigments, UV light stabilizers, antioxidants, heat stabilizers, fungicides, coupling agents, or fire retardants.

In embodiments including particle reinforcement instead of short natural fibers, a larger quantity of long fibers will be necessary to achieve the desired properties. In various embodiments, the sheets are between 16" and 48" wide, about ⅛" to ¼" thick and the interlocking edges are about 1" to 2" high. The length of the sheets can be up to about 20 ft.

An exemplary formulation for the sheet includes 50% kenaf fiber, 4% inorganic pigment, 0.1% 8HALS UV stabilizer, 0.1% antioxidant, 8% magnesium hydroxide fire retardant, 2% zinc borate fungicide and about 2% maleic anhydride grafted polyethylene coupling agent. The balance is polyethylene. In such embodiments, inorganic pigments include iron oxides and other mixed metal oxides (MMO's), zinc ferrite, carbon black, titanium dioxide, or a mixture thereof. The long, continuous glass fiber based fabric reinforcement (~5 wt % of the composite) is laminated to the underside of the sheet using a calendering setup common in multi-layer plastic sheet manufacturing.

Figure 15:
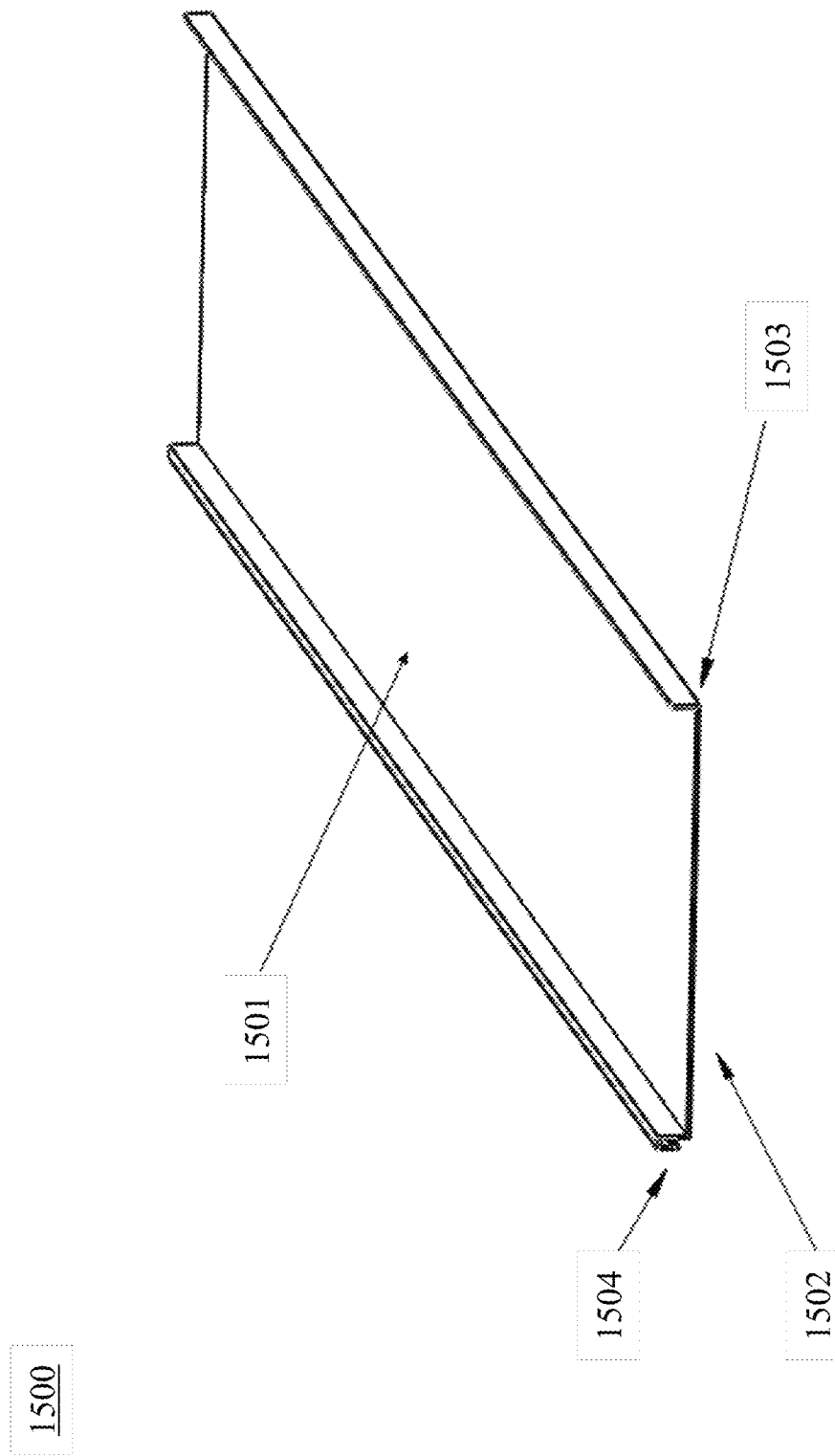
FIG. 15 is a top view of a roofing panel with edges thermoformed to interlock according to embodiments of the present disclosure.

With reference now to FIG. 15, an exemplary roofing sheet is illustrated. Roofing sheet 1500 is made of a high modulus, low CLTE thermoplastic natural fiber composite material. Exposed portion 1501 may include an embossed texture. The unexposed underside 1502 may include a thin integrated glass-fiber fabric. Sheet 1500 has male 1503 and female 1504 interlocking edges that have been bent by a suitable manufacturing process, e.g., thermoforming, into their respective shapes.

Figure 16:
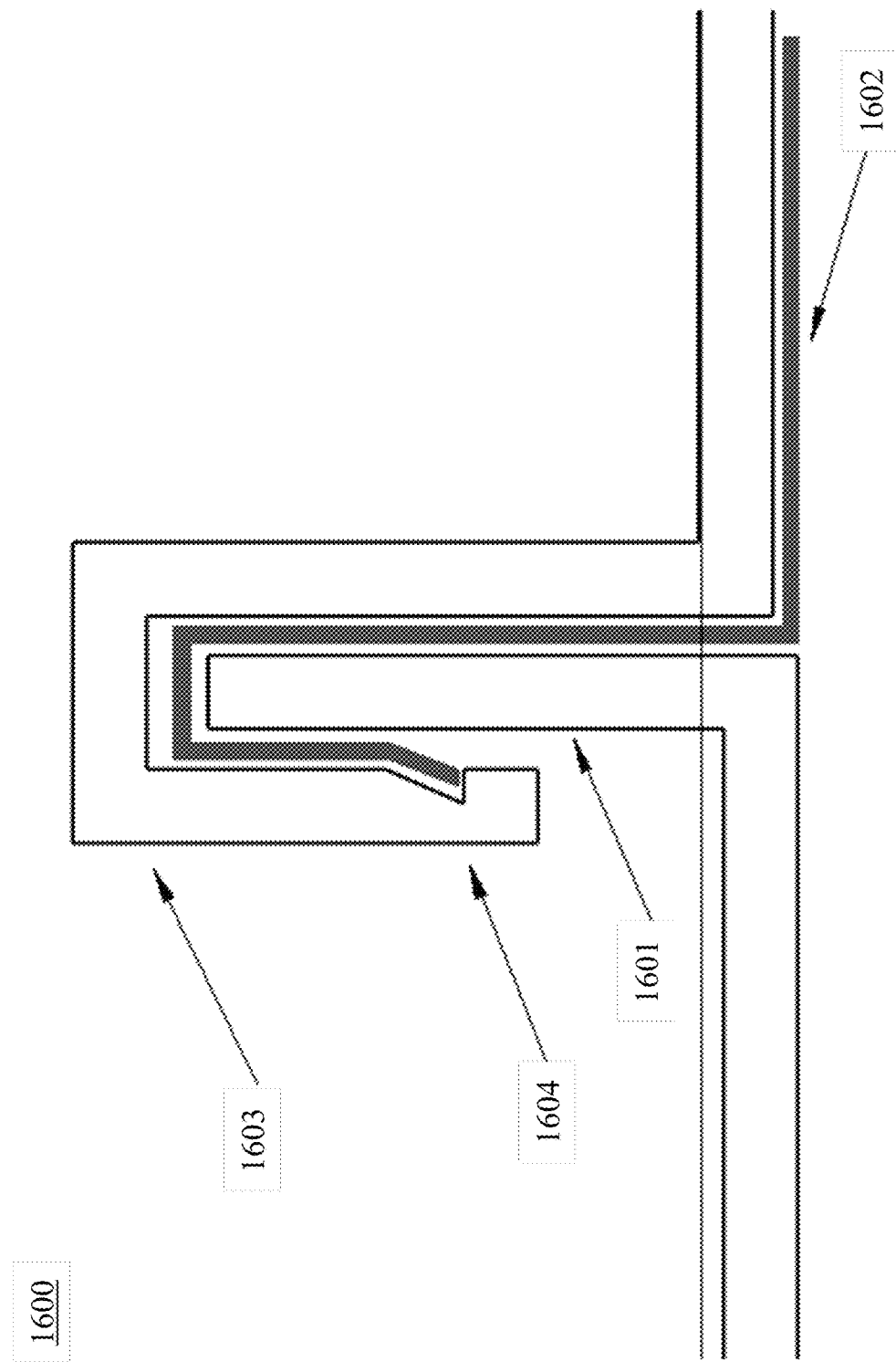
FIG. 16 is a cross-sectional view of the joined interlocking edges of a roofing panel according to embodiments of the present disclosure.

With reference now to FIG. 16, an exemplary roofing sheet with interlocking edges is illustrated. Roofing sheet 1600 edges are thermoformed from a high modulus, low CLTE thermoplastic natural fiber composite structural material originally produced as a flat sheet. Male edge 1601 is thermoformed to be at a 90 degree angle protruding from the deck and held to the deck with a metal or plastic clip 1602 that is screwed or nailed to the roofing deck. Female edge 1603 is thermoformed into a U channel with a notch 1604 to cover, lock into the clip seal the edge assembly from water intrusion.

Figure 17:
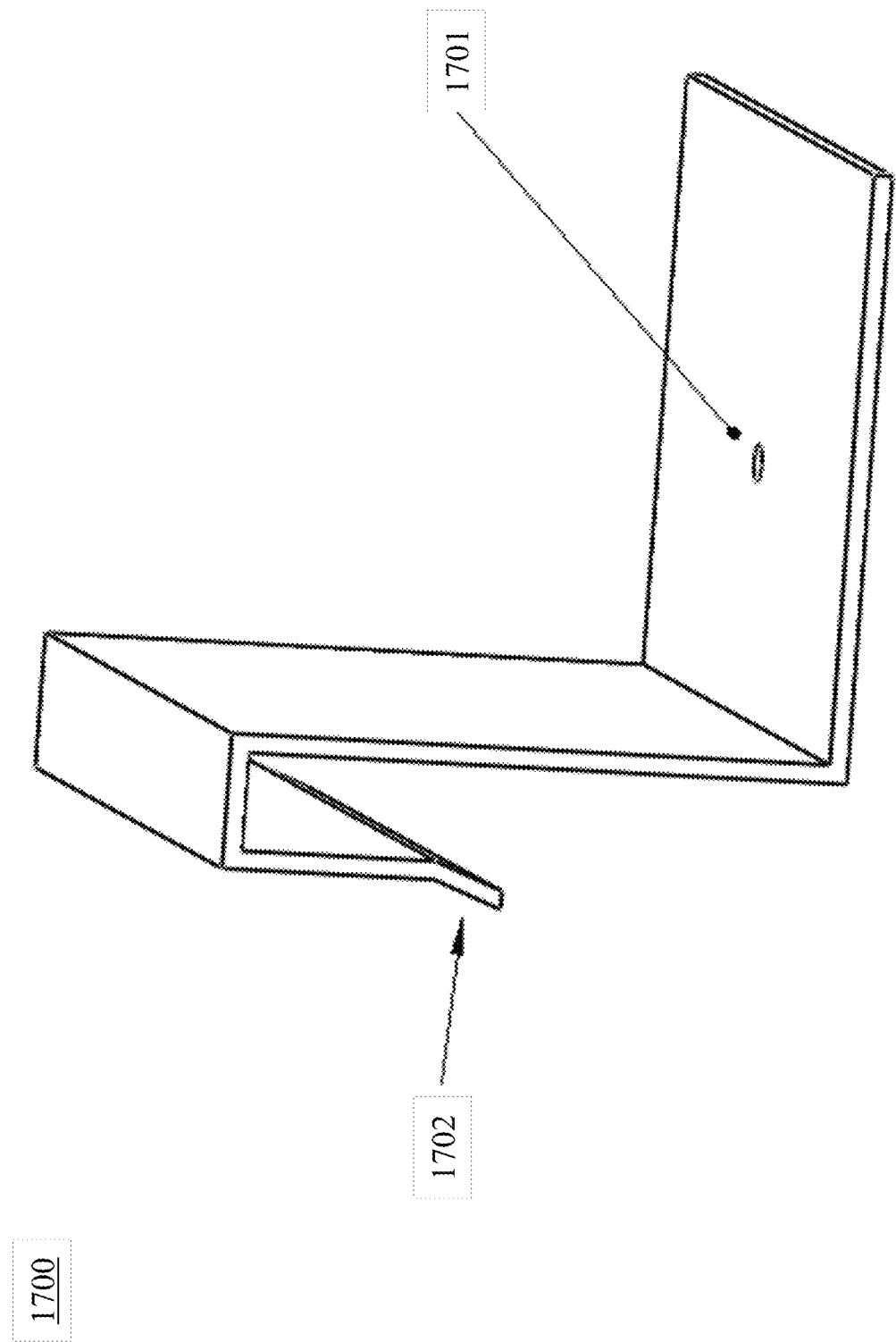
FIG. 17 is an overview of a typical roofing panel edge mounting clip according to embodiments of the present disclosure.

With reference now to FIG. 17, an exemplary mounting clip is illustrated. Clip 1700 can be made from any material such as metal, fiberglass, plastic, etc., as long as it has suitable strength to hold the roofing sheet in place for the lifetime of the roofing. This particular clip has a pre-drilled hole 1701 for mounting to the roof deck with a screw or nail. The clip also has portion of the U-channel with a protruding angle section 1702 that interlocks with the female edge of the roofing sheet 1704.

It will be appreciated that there are a variety of interlocking and mounting schemes for such roofing sheets known in the art. The present disclosure describes one type of interlock by way of example and not limitation. It will be appreciate that the materials described herein are suitable for a variety of alternative interlocks.

Natural Fiber-Reinforced Polymer Solar Panel Mounting Frames

Solar electric roofing is expensive not only because of the cost of the solar cells but because of installation and the cost of the structure. Solar panels are typically made from solar cells adhered to glass and have an aluminum frame to facilitate mounting. Mounting requires special mounts on top of existing roofing and although there new solar shingles on the market (e.g. Dow, Tesla), these are expensive and require specialized installation techniques using skilled installers.

To address these and other disadvantages of solar roofing, the present disclosure provides for a low-cost structure made of a composite of thermoplastics and natural fibers that have a sufficiently low thermal expansion and high modulus of elasticity to support solar modules without causing undue stress on the module assembly. This disclosure also shows a panel that installs very similar to that of wood or asphalt shingles or wood shakes requiring no special skill (except for the final wiring of the panels to your electrical box).

To address these and other disadvantages of solar roofing, the present disclosure provides for a low-cost structure made of a composite of thermoplastics and natural fibers that have a sufficiently low thermal expansion and high modulus of elasticity to support solar modules without causing undue stress on the module assembly. This disclosure also shows a panel that installs very similar to that of wood or asphalt shingles or wood shakes requiring no special skill (except for the final wiring of the panels to your electrical box).

In various embodiments, the panel is made from a molded composite of natural or synthetic fibers and thermoplastics. According to various embodiments, natural fibers and/or fabrics may include jute, wood, flax, kenaf, cotton, hemp, nanocellulose, bamboo, cellulose, ramie, banana, pineapple, or sisal and synthetic fibers and/or fabrics may include nylon, Kevlar, basalt, glass, carbon, or polyester. According to various embodiments, thermoplastics include polyolefins, nylon, PLA, PVC, or polyesters. Various embodiments have fibers with an aspect ratio of greater than about 5:1. Some such embodiments have fibers with an aspect ratio of greater than about 20:1. Some such embodiments have fibers with an aspect ratio of greater than about 100:1.

The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10^{-5}/°$ F. In some embodiments, the CLTE is less than about $1 \times 10^{-5}/°$ F. As described below, further addition of long fiber reinforcement increases the MOE and MOR and decreases the CLTE.

In various embodiments, the natural fiber composite formulation includes additives such as pigments, UV light stabilizers, antioxidants, heat stabilizers, fungicides, coupling agents, or fire retardants. In various embodiments, pigments include iron oxides and other mixed metal oxides (MMO's), zinc ferrite, carbon black, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate, microban, or microban-type compounds. In various embodiments, coupling agents include maleated polyolefins, or Maleic anhydride grafted styrene-ethylene-butylene-styrene block copolymer (SEBS-g-MA). In various embodiments, fire retardants include magnesium hydroxide, alumina trihydrate, or borates. In various embodiments, suitable pigments include iron oxides and other mixed metal oxides (MMO's), zinc ferrite, carbon black, or titanium dioxide. Other suitable additives and/or coatings useful in composite manufacturing will be apparent to one skilled in the art upon consideration of this disclosure.

In various embodiments, particles include wood, rice hulls, wheat straw dust, fly ash, calcium carbonate, ground recycled asphalt shingles, mica, clay, nanoclay, or talc may be adequate in place of natural fibers.

In various embodiments, the panels are between 12" and 60" wide, about 1" to 2" thick at the butt end tapering to about 1/8" at the tip of the headlap. An exemplary formulation for the sheet includes 50% kenaf fiber, 1% carbon black, pigment, 0.1% HALS UV stabilizer, 0.1% antioxidant, 5% magnesium hydroxide fire retardant, 2% zinc borate fungicide and about 2% maleic anhydride grafted polyethylene coupling agent. The balance is polyethylene such as recycled #2 plastic bottles.

Figure 18:
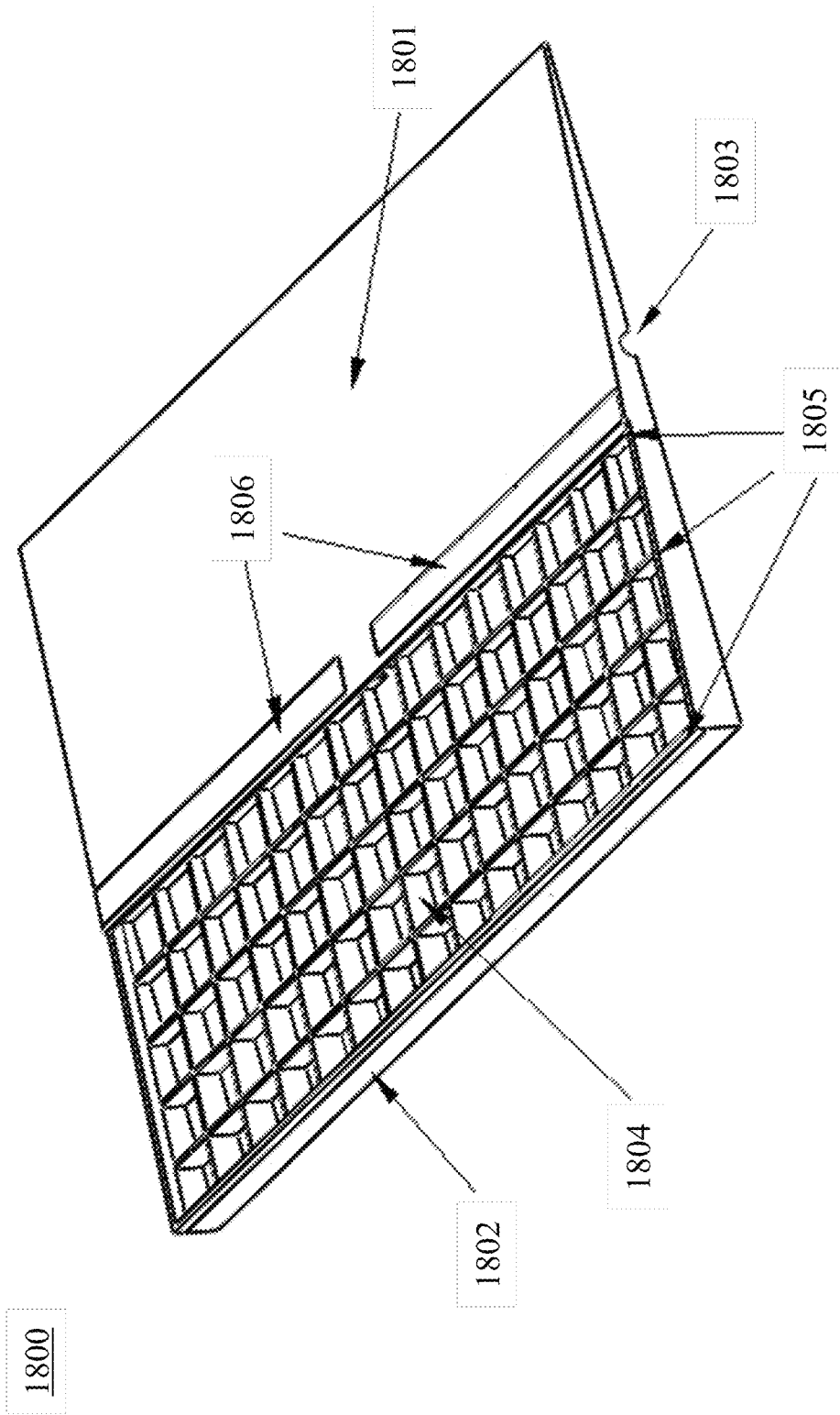
FIG. 18 is a top view of a roofing panel according to embodiments of the present disclosure without a mounted solar module.

With reference now to FIG. 18, an exemplary roofing panel is illustrated. Roofing panel 1800 is comprised of a high bending modulus, low CLTE thermoplastic natural fiber composite structural material. The headlap portion of the panel 1801 may include an embossed texture or grooves to facilitate water runoff and is about 12" high and about 36" wide. The butt edge 1802 is exposed to light and is about 1" high. The grid structure 1804 is open and can be square or rectangular or hexagonal structure but of sufficient stiffness and strength to support a glass solar module, perhaps under the load of an installer walking on the roof. The panel also has a lateral notch 1803 that allows the passage of wires side to side from panel to adjacent panel. To hold the solar module in-place there are lips 1805 that border the solar model and prevent it from shifting. A sealant should be used to mount the solar module to prevent water intrusion. The nailing area of the panel 1806 is of sufficient thickness and strength to allow pneumatic nailing for rapid installation.

Figure 19:
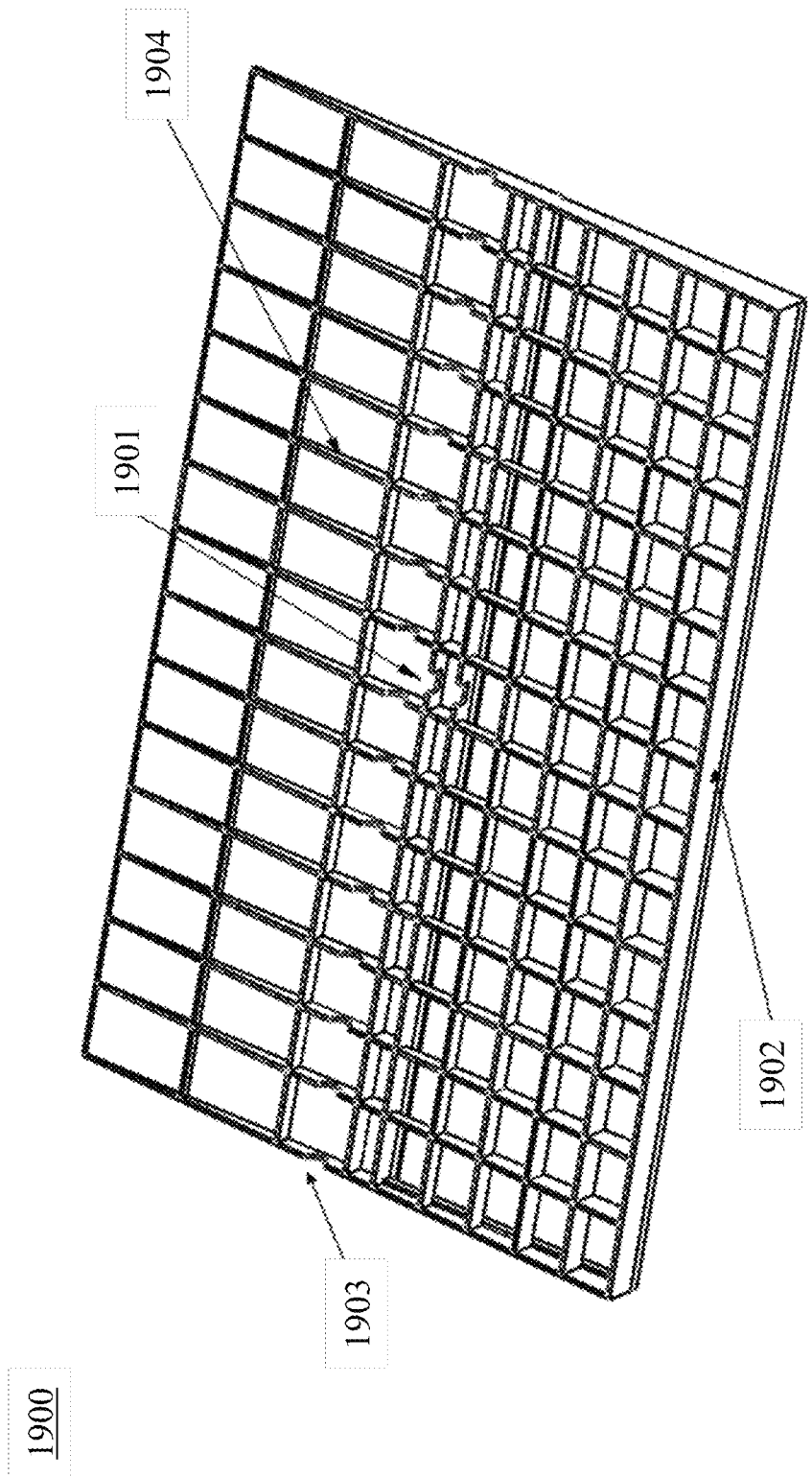
FIG. 19 is the underside view of the roofing panel shown in FIG. 18 according to embodiments of the present disclosure without a mounted solar module.

With reference now to FIG. 19, the underside of an exemplary roofing panel is illustrated. To facilitate wiring the solar module to the panel and to other adjacent panels a cutout is provided 1901 to allow wires from the exposed portion of the panel pass to the headlap and the cutout 1903 allows the wires pass to adjacent panels. The underside of the headlap 1904 is comprised of ribs to lighten the product and maintain the tapered form of the roofing panel. The headlap 1902 is also shown and borders the exposed portion of the panel and the solar module.

Figure 20:
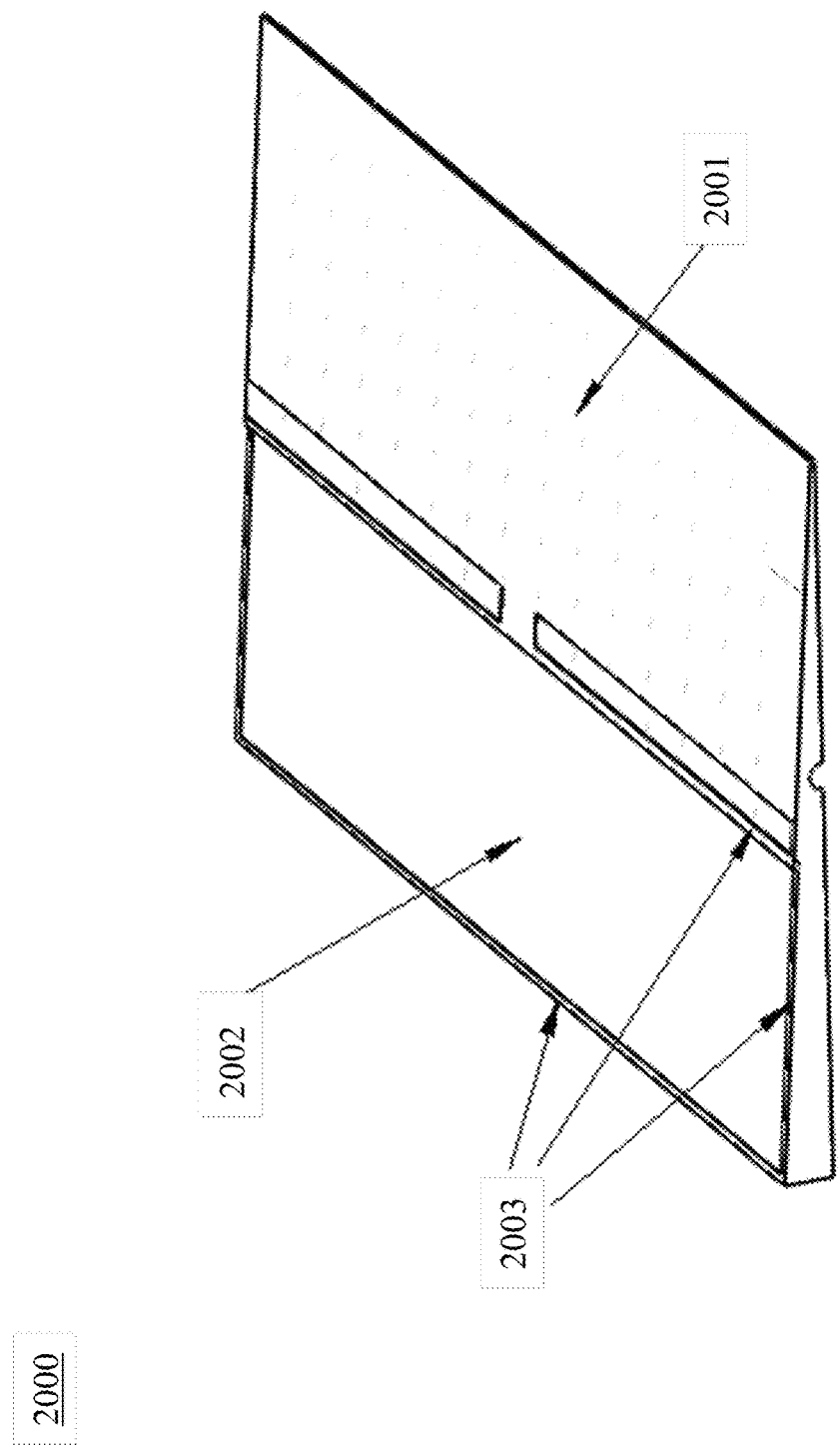
FIG. 20 shows the top of a roofing panel according to embodiments of the present disclosure with an embedded solar module.

With reference now to FIG. 20, an exemplary roofing panel is illustrated. Below the headlap 2001, the exposed portion of the panel that is bordered by lips 2003 that retain the solar module 2002. The solar module can be flush with the lips and mounted into the grid structure underneath with clips that are mounted on the solar module and lock into the grid structure.

It will be appreciated that there are a variety of ways that a solar module can be mounted to a grid panel and sealed from the environment, as well as different locations for routing wiring depending upon the manufacturer of the solar module. Likewise, it will be appreciated that there may be different interlocking and mounting schemes for these roofing sheets. It will be appreciated that the materials described herein are suitable for use with a variety of module types and configurations.

Green vegetative roofing is typically used on flat roofing or low-slope roofing. Installation on sloped roofing typically uses multiple layers of waterproofing as well as rubber sheets with pockets to support vegetation. The present disclosure provides for molded panels shaped and installed like normal wood shingles or shakes but with pockets that support vegetation. These panels can also be installed on roofs of any slope. The composite of thermoplastics and natural fibers have a sufficiently low thermal expansion to prevent buckling or warping of panels while using a minimum number of nails or screws for mounting.

In various embodiments, the roofing and/or solar mounting panels described herein may be used for mounting water or fluid reservoirs in/on the panels to thereby absorb heat that can be used for space heating or water heating. Analogous to a solar module, the water reservoir would be exposed to the sun and underneath have fixtures for mounting and routing tubing with connections for connecting to adjacent panels.

In various embodiments, the panel is made from a molded composite of natural or synthetic fibers and thermoplastics. According to various embodiments, natural fibers and/or fabrics may include jute, wood, flax, kenaf, cotton, hemp, nanocellulose, bamboo, cellulose, ramie, banana, pineapple, or sisal and synthetic fibers and/or fabrics may include nylon, Kevlar, basalt, glass, carbon, or polyester. According to various embodiments, thermoplastics include polyolefins, nylon, PLA, PVC, or polyesters. Various embodiments have fibers with an aspect ratio of greater than about 5:1. Some such embodiments have fibers with an aspect ratio of greater than about 20:1. Some such embodiments have fibers with an aspect ratio of greater than about 100:1. The extruded or molded natural fiber thermoplastic composite material of various embodiments has a Young's Modulus (MOE) of greater than about 550,000 psi and Modulus of Rupture (MOR) of greater than about 5000 psi. Some such embodiments have a MOE greater than about 1,000,000 psi and a MOR greater than about 10,000 psi. The structural material has a coefficient of linear thermal expansion (CLTE) less than about $1.4 \times 10-5/°$ F.

In various embodiments, the natural fiber composite formulation includes additives such as pigments, UV light stabilizers, antioxidants, heat stabilizers, fungicides, coupling agents, or fire retardants. In various embodiments, pigments include iron oxides and other mixed metal oxides (MMO's), zinc ferrite, carbon black, or titanium dioxide. In various embodiments, UV light stabilizers includes HALS, titanium dioxide, carbon black, nickel quenchers, benzophenones, or benzotriazoles. In various embodiments, antioxidants include hindered phenols, phosphites, or thioesters. In various embodiments, heat stabilizers include organophosphites or hindered phenols. In various embodiments, fungicides include zinc borate or microban. In various embodiments, coupling agents include maleated polyolefins, or Maleic anhydride grafted styrene-ethylene-butylene-styrene block copolymer (SEBS-g-MA). In various embodiments, fire retardants include magnesium hydroxide, alumina trihydrate, or borates. In various embodiments, suitable pigments include iron oxides and other mixed metal oxides (HMO's), zinc ferrite, carbon black, or titanium dioxide. The headlap surface can be embossed with grooves to facilitate water shedding.

In various embodiments, particles instead of fibers may provide sufficiently high strength and low CLTE and may include wood, rice hulls, wheat straw dust, fly ash, calcium carbonate, ground recycled asphalt shingles, mica, talc, clay, or nanoclay. In various embodiments, the composite formulation includes additives such as pigments, UV light stabilizers, antioxidants, heat stabilizers, fungicides, coupling agents, or fire retardants.

Figure 21:
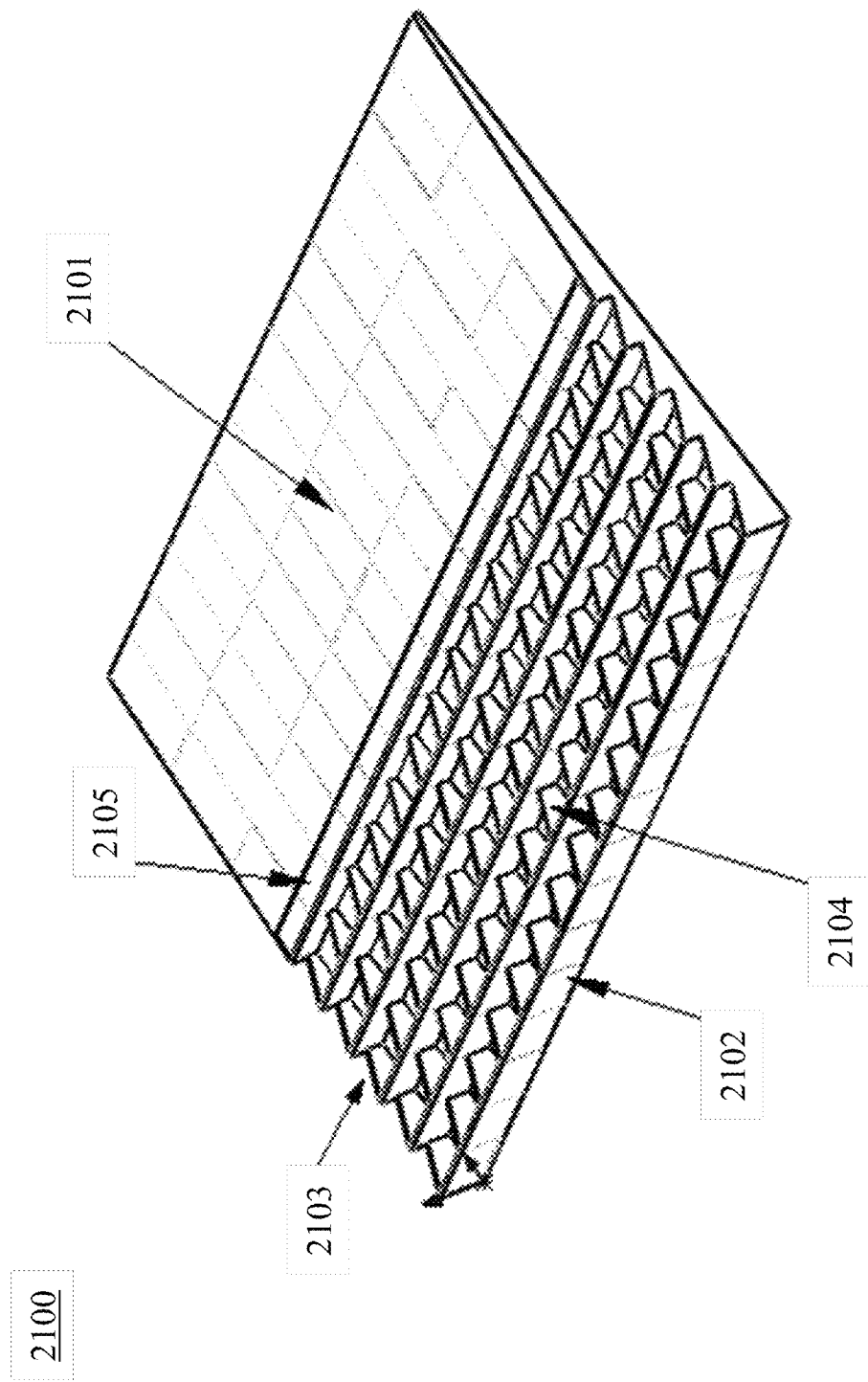
FIG. 21 is a top view of a roofing panel according to embodiments of the present disclosure with unexposed headlap and exposure that has molded receptacles to hold soil and vegetation.

With reference now to FIG. 21, an exemplary roofing panel 2100 is illustrated. Roofing panel 2100 is made of a high bending modulus, low CLTE thermoplastic natural fiber composite material as described above. The headlap 2101 is not exposed to light and is may have embossed or molded in grooves to facilitate the shedding of water. The headlap also includes a marked or labeled portion 2105 where nailing is permitted without affecting the functionality of the installed roofing. The butt end 2102 is about 2" tall and is exposed to light as well as the top of the grid structure 2104 that holds the soil and vegetation. The pockets are molded with the same inclination 2103 of the installed roofing and in this installation is about 5:12.

Figure 22:
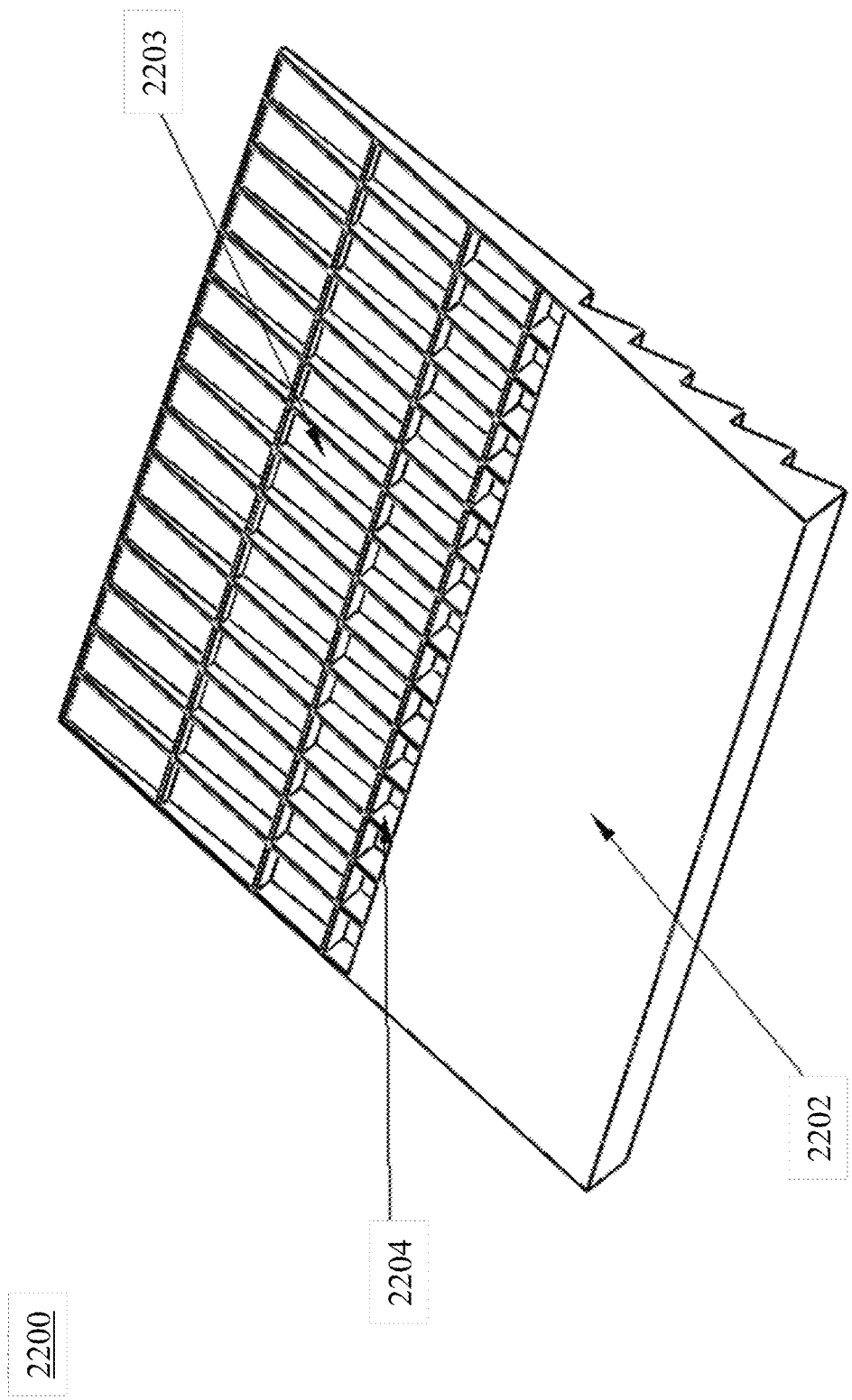
FIG. 22 shows the underside of the roofing panel shown in FIG. 21 according to embodiments of the present disclosure.

With reference now to FIG. 22, the underside of an exemplary roofing panel is illustrated. Roofing panel 2200 illustrates the underside structure of the headlap 2203 and the underside structure of the nailing area 2204 with thicker and more frequent ribs to handle pneumatic nailing. The underside of the vegetative pocket exposure area 2202 is sealed to hold the water, soil and vegetation in the pockets and will rest flush against the headlap of the installed shake underneath.

It will be appreciated that a variety of pocket designs are suitable for use with the materials provided herein, including hexagonal or cylindrical. Likewise, a variety of depths may be used depending upon the type of vegetation used.

In various embodiments, the natural fiber reinforced thermoplastic members described herein may be used in any suitable application, such as, for example, solar panel framing, window frames, skylight frames, tilt-up construction lumber, temporary road mats, sill plates, home exterior molding and trim, fence boards, and/or floating or stationary dock support boards and decking.

In various embodiments, manufacturing methods for long fiber inclusion may include the following. For thin products (e.g., standing seam roofing and siding), the product may be manufactured by extruding sheet out of the short-fiber reinforced thermoplastic with a flex-lip die mounted on a twin-screw extruder. A synthetic or natural fiber mat or fabric may be calendered along with the extruded sheet thus pressing the mat or fabric into the molten extruded material. The sheet would then be thermoformed into the desired shape either immediately after calendering or after the mat/fabric reinforced sheet is cooled, cut to size and reheated.

For thicker products (e.g., a railroad tie, decking, or structural lumber), long glass fibers may be co-extruded with the molten short-fiber reinforced thermoplastic. The long glass fiber strands or mat or fabric may be pulled in through the back of the extrusion die either with or without impregnating with a thermoset resin/catalyst system.

For molded products (e.g., roofing or siding panels), a glass or synthetic fiber mat or fabric may be strategically placed in the mold before injecting or placing the molten composite material in the mold.

In various embodiments, the following exemplary formulations may be used to manufacture any of the structures described herein:

General Formulation: 0-20% long glass fiber mat or fabric, 40-70% short kenaf or other natural fiber, 0-2% carbon black pigment, 0-5% inorganic pigment(s) (together), 0-15% magnesium hydroxide or aluminum trihydrate, 0-3% zinc borate fungicide, 0-5% coupling agent, 0-0.5% HALS UV stabilizer, and/or 0-0.5% antioxidant.

Exemplary Deckboard Formulation: 56% Greenfirm Bangladesh 60-90 mm cut kenaf bast fiber, 0.1% Addivant Lowlite® 62 hindered amine light stabilizer, 0.1% Addivant Lowlite® 94 hindered amine light stabilizer, 0.1% Addivant Alkonox® 240 phosphite antioxidant, 0.1% Addivant Anox® 20 phenolic antioxidant, 2.6% Addivant Polybond 3009 maleic anhydride grafted polyethylene coupling agent, 5% DOW™ HDPE 25055E high density polyethylene, 25% Recycled High Density Polyethylene #2 (post-consumer), 5% Huber Micral® 932 Aluminum TriHydrate fire retardant, 2% US Borax Firebrake® ZB zinc borate, 4% BAYFERROX 645T manganese oxide brown pigment. In various embodiments, JLON texturized glass roving 100 Tex weight may be co-extruded into specific locations of the board as described above.

Exemplary I-beam Formulation: 59% Greenfirm Bangladesh 60-90 mm cut kenaf bast fiber, 1% Cabot Vulcan 3 carbon black, 3% Addivant Polybond 3009 maleic anhydride grafted polyethylene coupling agent, 5% DOW™ HDPE 25055E high density polyethylene, 25% Recycled High Density Polyethylene #2 (post-consumer), 5% Huber Micral® 932 Aluminum TriHydrate fire retardant, 2% US Borax Firebrake® ZB zinc borate. In various embodiments, 400 g/M^2 woven E-glass fiber may be co-extruded just under surface of the top & bottom flanges and impregnated with 800 g/M^2 AOC Altek® H520-B polyester resin with 0.5% Methyl Ethyl Ketone Peroxide (MEKP).

Exemplary Compression Molded Railroad Tie Formulation: 59% Hemp Traders ½" raw bast fiber, 1% Cabot Vulcan 3 carbon black, 3% Addivant Polybond 3009 maleic anhydride grafted polyethylene coupling agent, 5% DOW™ HDPE 25055E high density polyethylene, 25% Recycled High Density Polyethylene #2, post-consumer, 5% Huber Micral® 932 Aluminum TriHydrate fire retardant, 2% US Borax Firebrake® ZB zinc borate.

Exemplary Siding Formulation: 60% Greenfirm Bangladesh 60-90 mm cut kenaf bast fiber, 3% Addivant Polybond 3000 maleic anhydride grafted polyproylene coupling agent, 30% ExxonMobil™ PP1024E4 13 melt flow polypropylene homopolymer, 5% Huber Micral® 932 Aluminum TriHydrate fire retardant, 2% US Borax Firebrake® ZB zinc borate. In various embodiments, one or more surfaces of the siding may be embossed with wood grain, sandblasted to expose natural fiber and sprayed with pigmented PVDF coating for weathering and fire resistance.

Exemplary Sheet Roof Formulation: 54% Greenfirm Bangladesh 60-90 mm cut kenaf bast fiber, 4% BAYFERROX 645T manganese oxide brown pigment, 0.1% Addivant Lowlite® 62 hindered amine light stabilizer, 0.1% Addivant Lowlite® 94 hindered amine light stabilizer, 0.1% Addivant Alkonox® 240 phosphite antioxidant, 0.1% Addivant Anox® 20 phenolic antioxidant, 5% Addivant Polybond 3009 maleic anhydride grafted polyethylene coupling agent, 25% Recycled High Density Polyethylene #2 (post-consumer), 5% DOW™ HDPE 25055E high density polyethylene, 5% Huber Micral® 932 Aluminum TriHydrate fire retardant, 2% US Borax Firebrake® ZB zinc borate. In various embodiments, W400 glass fabric may be calendered into the underside of a sheet before thermoforming the sheet into the final shape.

Exemplary Injection Molded Solar and Vegetative Roof Panel Formulation: 50% Greenfirm Bangladesh 60-90 mm cut kenaf bast fiber, 1% Cabot Vulcan 3 carbon black, 2% Addivant Polybond 3009 maleic anhydride grafted polyethylene coupling agent, 40% DOW™ HDPE 25055E high density polyethylene, 5% Huber Micral® 932 Aluminum TriHydrate fire retardant, 2% US Borax Firebrake® ZB zinc borate.

Exemplary Compression Molded Solar and Vegetative Roof Panel Formulation: 55% Rice Hull Specialties 16/80 ground rice hulls, 1% Cabot Vulcan 3 carbon black, 2% Addivant Polybond 3009 maleic anhydride grafted polyethylene coupling agent, 30% Recycled High Density Polyethylene #2 (post-consumer), 5% DOW™ HDPE 25055E high density polyethylene, 5% Huber Micral® 932 Aluminum TriHydrate fire retardant, 2% US Borax Firebrake® ZB zinc borate.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
a body comprising a fiber-reinforced polymer composite, a longitudinal axis, a first end and a second end along the longitudinal axis, a void space within the body, the composite comprising a polymer matrix, a first fiber reinforcement, and a second fiber reinforcement;
wherein the polymer matrix comprises polyethylene;
wherein the first fiber reinforcement comprises kenaf fibers, the kenaf fibers have an aspect ratio of about 5:1 to 100:1 dispersed within the polymer matrix, and the kenaf fibers comprise between about 50% to about 60% of the composite; and
wherein the second fiber reinforcement comprises fibers extending from the first end to the second end.

2. The device of claim 1, wherein the kenaf fibers are uniformly dispersed within the polymer matrix.

3. The device of claim 1, wherein the fibers extending from the first end to the second end comprise synthetic fibers.

4. The device of claim 3, wherein the synthetic fibers comprise glass fibers.

5. The device of claim 1, wherein the fibers extending from the first end to the second end are molded onto a predetermined location on the body.

6. The device of claim 1, wherein the fibers extending from the first end to the second end comprise between about 5% to about 20% of the composite.

7. The device of claim 1, wherein the polyethylene is high-density polyethylene, the composite further comprises about 2% inorganic pigment, about 0.1% synergistic hindered amine light stabilizer (HALS), about 0.05% phenolic antioxidant, about 0.05% phosphite heat stabilizer, about 3% magnesium hydroxide fire retardant, about 1% zinc borate fungicide, and about 2% maleic anhydride grafted polyethylene coupling agent.

8. The device of claim 1, wherein the composite further comprises about 1% carbon black, about 0.1% antioxidant or heat stabilizer, about 1% zinc borate fungicide, and about 2% maleic anhydride grafted polyethylene coupling agent.

9. The device of claim 1, wherein the composite further comprises about 4% inorganic pigment, about 0.1% hindered amine light stabilizer (HALS) ultraviolet (UV) stabilizer, about 0.1% antioxidant, about 8% magnesium hydroxide fire retardant, about 2% zinc borate fungicide, and about 2% maleic anhydride grafted polyethylene coupling agent.

10. The device of claim 1, wherein the composite further comprises about 1% carbon black pigment, about 0.1% antioxidant, about 5% magnesium hydroxide fire retardant, about 2% zinc borate fungicide, and about 2% maleic anhydride grafted polyethylene coupling agent.

11. A decking board comprising:
a structural shell having at least one void therein, the structural shell comprising high-density polyethylene and about 60% kenaf fibers, about 2% inorganic pigment, about 0.1% synergistic hindered amine light stabilizer (HALS), about 0.05% phenolic antioxidant, about 0.05% phosphite heat stabilizer, about 3% magnesium hydroxide fire retardant, about 1% zinc borate fungicide, and about 2% maleic anhydride grafted polyethylene coupling agent, wherein the kenaf fibers have an aspect ratio of about 5:1 to 100:1.

12. A siding board comprising:
a structural shell having at least one void formed by a concave portion thereof, the structural shell comprising polypropylene and about 60% kenaf fibers, about 3% inorganic pigment, about 0.1% hindered amine light stabilizer (HALS) ultraviolet (UV) stabilizer, about 0.1% antioxidant, about 5% magnesium hydroxide fire retardant, about 1% zinc borate fungicide, and about 2% maleic anhydride grafted polypropylene coupling agent, wherein the kenaf fibers have an aspect ratio of about 5:1 to 100:1.

13. A railroad tie comprising:
a structural shell having at least two substantially parallel voids extending parallel to a central axis of the structural shell, the structural shell comprising polyethylene and about 60% kenaf fibers, about 1% carbon black, about 0.1% antioxidant or heat stabilizer, about 1% zinc borate fungicide, and about 2% maleic anhydride grafted polyethylene coupling agent, wherein the kenaf fibers have an aspect ratio of about 5:1 to 100:1; and
a plurality of blocks disposed within the two substantially parallel voids at regular intervals, the plurality of blocks comprising about 50% rice hulls, about 48% recycled post-consumer high density polyethylene (HDPE), and about 2% maleic anhydride grafted HDPE.

14. A device comprising:
a body comprising a fiber-reinforced polymer composite, a longitudinal axis, a first end and a second end along the longitudinal axis, a void space within the body, the composite comprising a polymer matrix, a first fiber reinforcement, and a second fiber reinforcement;
wherein the polymer matrix comprises polypropylene;
wherein the first fiber reinforcement comprises kenaf fibers, the kenaf fibers have an aspect ratio of about 5:1 to 100:1 dispersed within the polymer matrix, and the kenaf fibers comprise between about 50% to about 60% of the composite; and
wherein the second fiber reinforcement comprises fibers extending from the first end to the second end.

15. The device of claim 14, wherein the composite further comprises about 3% inorganic pigment, about 0.1% hindered amine light stabilizer (HALS) ultraviolet (UV) stabilizer, about 0.1% antioxidant, about 5% magnesium hydroxide fire retardant, about 1% zinc borate fungicide, and about 2% maleic anhydride grafted polypropylene coupling agent.

16. A device comprising:
a body comprising a fiber-reinforced polymer composite, a longitudinal axis, a first end and a second end along the longitudinal axis, a void space within the body, the composite comprising a polymer matrix, a first fiber reinforcement, and a second fiber reinforcement;
wherein the polymer matrix comprises polyethylene;
wherein the first fiber reinforcement is selected from the group consisting of: wood fibers, hemp fibers, and kenaf fibers, the first fiber reinforcement comprises an aspect ratio of about 5:1 to 100:1 dispersed within the polymer matrix, and the kenaf fibers comprise between about 50% to about 60% of the composite; and
wherein the second fiber reinforcement comprises fibers extending from the first end to the second end.

17. The device of claim 16, wherein the polyethylene is high-density polyethylene, the composite further comprises about 2% inorganic pigment, about 0.1% synergistic hindered amine light stabilizer (HALS), about 0.05% phenolic antioxidant, about 0.05% phosphite heat stabilizer, about 3% magnesium hydroxide fire retardant, about 1% zinc borate fungicide, and about 2% maleic anhydride grafted polyethylene coupling agent.

18. The device of claim 16, wherein the composite further comprises about 1% carbon black, about 0.1% antioxidant or heat stabilizer, about 1% zinc borate fungicide, and about 2% maleic anhydride grafted polyethylene coupling agent.

19. The device of claim 16, wherein the composite further comprises about 4% inorganic pigment, about 0.1% hindered amine light stabilizer (HALS) ultraviolet (UV) stabilizer, about 0.1% antioxidant, about 8% magnesium hydroxide fire retardant, about 2% zinc borate fungicide, and about 2% maleic anhydride grafted polyethylene coupling agent.

20. The device of claim 16, wherein the composite further comprises about 1% carbon black pigment, about 0.1% antioxidant, about 5% magnesium hydroxide fire retardant, about 2% zinc borate fungicide, and about 2% maleic anhydride grafted polyethylene coupling agent.

* * * * *